US008056243B2

(12) United States Patent
Sargeant et al.

(10) Patent No.: US 8,056,243 B2
(45) Date of Patent: Nov. 15, 2011

(54) POWER TOOL

(75) Inventors: Paul Sargeant, Wallsend (GB); Scott Keenlyside, Auckland Park (GB); Roger Thomas, Stockton-on-Tees (GB); Rainer Herting, Hellenhahn (DE)

(73) Assignee: Black & Decker Inc., Newark, DE (US)

( * ) Notice: Subject to any disclaimer, the term of this patent is extended or adjusted under 35 U.S.C. 154(b) by 539 days.

(21) Appl. No.: 12/287,125

(22) Filed: Oct. 6, 2008

(65) Prior Publication Data

US 2009/0133559 A1 May 28, 2009

(30) Foreign Application Priority Data

Oct. 4, 2007 (GB) .................................. 0719802.1
Nov. 30, 2007 (GB) .................................. 0723484.2

(51) Int. Cl.
*B23D 47/02* (2006.01)
(52) U.S. Cl. ........................ 30/377; 30/388; 144/136.95
(58) Field of Classification Search .................... 30/371, 30/374, 377, 388; 144/136.95, 154.5, 48.5; 409/180, 218, 229; 83/496
See application file for complete search history.

(56) References Cited

U.S. PATENT DOCUMENTS 4,999,916 A * 3/1991 Sistare ............................ 30/376
5,010,651 A * 4/1991 Techter et al. .................. 303/76
5,271,155 A * 12/1993 Fuchs et al. ...................... 30/376
6,612,349 B2 * 9/2003 Smith et al. .............. 144/136.95
6,691,418 B1 * 2/2004 Lewin et al. ..................... 30/375
6,896,016 B1 * 5/2005 Smith et al. .............. 144/136.95
7,866,051 B2 * 1/2011 Niwa .............................. 30/377
2003/0136010 A1 * 7/2003 Childs et al. ..................... 30/388
2008/0115371 A1 * 5/2008 Allen et al. ...................... 30/517

FOREIGN PATENT DOCUMENTS

DE 3633655 A1 * 4/1988

* cited by examiner

*Primary Examiner* — Sean Michalski
(74) *Attorney, Agent, or Firm* — Michael Aronoff; Adan Ayala

(57) ABSTRACT

A power tool comprising a housing displaceably mounted to a foot plate, a blade, a motor, an electric switch and an interlock for controlling movement of the housing with respect to the foot plate. The interlock has a control button mounted to one of the housing or foot plate which cooperates with a channel fixed in relation to the other of the housing or foot plate. The control button can select between a plunge cut mode wherein the blade can protrude below the foot plate, or a blade change mode wherein the blade is prepared for a blade change operation. The channel comprises a major leg in communication with a minor leg. Cooperation between the button and the major leg selects the plunge cut mode. Cooperation between the button and the minor leg selects the blade change mode. The interlock may also comprise a housing lock and a spindle lock.

24 Claims, 25 Drawing Sheets

POWER TOOL

FIELD OF THE INVENTION

The invention relates to a power tool with a motor housing movably mounted on a foot plate. The power tool is normally biased by a plunge spring into a "parked" position where the housing is retracted away from the foot plate. The power tool's electric motor is connected to a power source via an on-off switch activated by a switch button.

BACKGROUND OF THE INVENTION

If the power tool is a plunge-cut circular saw its circular saw blade is shielded by a guard, except for when the housing is pushed towards the foot plate so that the saw blade protrudes through an aperture in the foot plate to perform a cutting operation. The housing and saw blade of a plunge-cut circular saw move relative to the foot plate about a pivot connecting the housing and foot plate.

If the power tool is a router it normally does not have a guard because its router bit is at least partially shielded by a pair of support columns, but the router blade does protrude through an aperture in the foot plate to perform a cutting operation when the housing is pushed towards the foot plate. The housing and router blade move relative to the foot plate in a straight line path guided by the pair of support columns which connect the housing and foot plate.

At the point of maximum protrusion of the circular saw blade, or the router bit, as the case may be, through the footplate, the housing is said to be in the "plunged" position.

An interlock may be used to control the extent to which the housing can move towards the foot plate and the conditions under which such movement occurs, like, for example, the isolation or de-isolation of the on-off switch, or locking or unlocking of the housing's movement or the blade's rotation.

FIG. 3 of patent publication DE 40 23 101 discloses an embodiment of a plunge saw comprising a tool housing displaceably mounted to a foot plate, a rotatable blade the rotational axis of which is fixed in relation to the housing, an electric motor for driving the blade, an electric switch manually operable by a switch button to energize the motor; and an interlock for controlling movement of the housing with respect to the foot plate. The interlock has a manually operable control button mounted to the housing and the control button cooperates with a side of a rail which is fixed in relation to the foot plate. This enables the control button to select between a plunge cut mode whereby movement of the housing is limited to between a parked position whereat the blade is entirely above the foot plate and a plunged position whereat the blade protrudes below the foot plate, or a blade change mode whereby movement of the housing is limited to between the parked position and a "blade change" position whereat the blade is prepared for a blade change operation.

When blade change mode is selected, the control button maintains isolation of the on-off switch by blocking manual movement of the switch button. This prevents energization of the motor. The housing is moveable into the blade change position. However, if ever the housing is accidentally released it naturally returns to the parked position under the bias of a plunge spring. The control button adopts a default mode which prevents the housing from leaving the parked position. The user must take care to maintain pressure on the housing otherwise blade change mode is automatically de-selected. It can be re-selected, but this requires repetition of a two-stage process which may require two hands: one hand to operate the control button and another hand to push the housing toward the foot plate. No hand is free to steady the plunge saw.

When plunge cut mode is selected, the control button de-isolates the on-off switch by unblocking movement of the switch button. Subsequent manual movement of the switch button energizes the motor and latches the switch button behind the control button to hold the latter in situ. The housing can move between the parked and plunge cut positions. However, if ever the switch button is accidentally released it naturally de-energizes the motor and unlatches the control button. The blade stops rotating and, if the control button is not manually held in situ, the control button adopts either the blade change mode, or, if the housing hasn't yet descended towards the plunged position, a default mode which prevents from leaving the parked position. Again, the user must take care to maintain pressure on the switch button otherwise plunge cut mode is automatically de-selected. It can be re-selected, but, again, this requires a two-stage process which may require two hands: one hand to operate the control button and another hand to operate the switch button. No hand is free to steady the plunge saw or a work piece upon which the plunge saw is performing a cutting operation.

BRIEF SUMMARY OF THE INVENTION

The object of the present invention is to provide a power tool with an improved interlock for controlling movement of the housing towards the foot plate and the conditions under which such movement occurs.

This object is achieved according to the present invention which is a power tool comprising a tool housing displaceably or pivotably mounted to a foot plate, a rotatable blade the rotational axis of which is fixed in relation to the housing, an electric motor for driving the blade, an electric switch manually operable by a switch button to energize the motor, and an interlock for controlling movement of the housing with respect to the foot plate, wherein the interlock has a manually operable control button mounted to one of the housing or foot plate and the control button cooperates with a channel fixed in relation to the other of the housing or foot plate to enable the control button to select between a plunge cut mode whereby movement of the housing is limited to between a parked position whereat the blade is entirely above the foot plate and a plunged position whereat the blade protrudes below the foot plate, or a blade change mode whereby movement of the housing is limited to between the parked position and a blade change position whereat the blade is prepared for a blade change operation, characterized in that the channel comprises a major leg and a minor leg in communication with the major leg, wherein cooperation between the control button and the major leg selects the plunge cut mode and cooperation between the control button and the minor leg selects the blade change mode.

Cooperation between the control button and the channel is a basic feature of the present invention. This cooperation may be directly between part of the control button and the channel, or via an intermediary, like, for example, a linkage or an arm. The blade may be any power tool cutting implement, like, for example, a circular saw blade or a router bit.

Typically, the channel is in part of a body fixed in relation to the foot plate while the control button is mounted to the housing. This has the advantage that the same hand that operates the control button to select plunge or blade change modes can also grasp the handle and push the housing towards the foot plate. However, the location of the control button and the groove can be reversed.

The channel may be a closed groove in a body fixed in relation to the housing or foot plate. This has the advantage that cooperation between control button and channel is maintained by the circumscribing nature of a closed groove. The channel need not be closed and could, instead, be relatively open like, for example, a path around the outer sides of a rail. The minor leg could be one side of the rail and the major leg could be the opposing side of the rail. The rail option works properly if the control button is biased into contact with the rail at all times, and provided that the rail is shaped to define the points at which the channel terminates. The termination points could be protruding pockets adapted to arrest the control button as it slides against the rail. Any combination of features that maintains cooperation between the channel and control button throughout relative movement between the housing and foot plate is acceptable. Once the mode of operation has been selected the limits of movement of the housing relative to the foot plate are positively defined until another mode of operation is positively selected. Thus, accidental release of the switch button does not unintentionally reverse the mode selection. This allows the user to concentrate on correctly manipulating the housing's movement in relation to the foot plate and steadying the power tool.

Preferably the major leg terminates at a point closer to the foot plate than the point at which the minor leg terminates. As a result, a blade change position can be located where the blade does not protrude below foot plate. If the power tool has have a blade guard, or other protection means, the blade remains shielded unless blade change mode is positively selected.

Preferably, the channel has a face substantially opposing the direction in which the housing moves towards the foot plate such that cooperation between the control button and the face selects a parked mode whereby movement of the housing from the parked position is blocked. The parked mode is beneficial because it allows the control button to immobilize movement between the housing and the foot plate when the power tool is not in operation.

Preferably, the control button is biased to cooperate with the face. This is in addition to the natural bias of the housing towards the parked position. As such, the parked mode is preferred and, in the interests of safety, the plunge cut or blade change modes require positive selection on the part of the user before the housing can be manually moved towards the foot plate.

Preferably, the face has a detent at a location where the face communicates with the rest of the channel. The detent, or detents, can be a small protrusion at a point, or points, of entry to the face's portion of the channel. The protrusion can be elastically deformable. The detent acts as a gateway to the face which must be overcome prior to cooperation between the control button and the face. As such, the control button is biased to cooperate with the face and this maintains the parked mode until one of the plunge cut or blade change modes is positive selected. Conversely, the detent, or detents, prevents unintentional selection of the parked mode.

Preferably, the face is part of a web in the channel and wherein the web connects the major and minor legs at a location where the housing is in the parked position. This arrangement forms an inverted U-shaped channel. This is a simple shape of channel which is well suited for the purposes of the interlock.

Preferably, the control button cooperates with the channel via an arm. A relatively small control button can be employed which is equipped with a relatively long reach by virtue of the arm. Thus, a compact control button need not be located aside the channel. This permits greater flexibility in the design of the interlock.

Preferably, the control button pivots about a control button axis fixed in relation to one of the housing or foot plate, wherein the arm is pivotally coupled at one end to the control button and pivotally connected part way along its length to an arm axis fixed in relation to the control button axis. Pivotal movement of the control button is a simple and conventional means of varying its position. Coupling the arm at one end to the control button translates this movement to the arm. The amplitude and direction of the arm's movement depends on the position of its pivotal connection to the arm's axis. For example, the closer the arm axis is to the control button the greater the amplitude of the arm's pivotal movement. As such, this arrangement is a simple and flexible means of facilitating cooperation between the control button and the channel.

Preferably, the arm has a control pin at a free end opposite the end of the arm coupled to the control button, wherein the control pin cooperates with the channel. If the channel is a closed groove then the pin can slide therein. If the channel is a path around the outer sides of a rail then the pin can slide against the rail. The pin is an adaptable means of cooperating with the channel.

Preferably, the control button is moveable into the path of the switch button, preventing actuation thereof, when the blade change mode is selected. This ensures that the motor cannot be energized, and the blade rotated, if the user has decided to perform a blade change operation. Blade change is almost impossible if the blade rotates. Optionally, the control button is also moveable into the path of the switch button, preventing actuation thereof, when the parked mode is selected. This ensures that the motor can only be energized, and the blade rotated, when plunge cut mode is selected.

Preferably the interlock comprises a manually moveable slider mounted to one of the housing or foot plate, wherein the slider is biased by a slider spring into a blocking position such that the slider blocks selection of the blade change mode by the control button. This is an optional feature which complements the bias of the control button in preventing accidental selection of the blade change mode.

Preferably, the interlock comprises a housing lock for locking the housing in the blade change position and a manually displaceable and rotatable control shaft for operating the housing lock, wherein the blocking position of the slider blocks operation of the control shaft. The housing lock is only used when the blade change position has been adopted and a blade change operation is desired. The housing lock secures the housing in relation to the foot plate at a location specially adapted for blade detachment i.e. the blade change position of the housing. The housing lock is deliberately inoperable until the slider is moved from its blocking position.

Preferably, the housing lock comprises a slideable dowel mounted to one of the housing or foot plate and coupled to the control shaft, and a recess fixed in relation to the other of the housing or foot plate, wherein movement of the plate from the blocking position enables (a) selection of the blade change mode, (b) movement of the housing into the blade change position such that the dowel is aligned with the recess, and (c) one of rotation or displacement of the control shaft which causes engagement of the dowel with the recess thereby operating the housing lock.

Preferably, the dowel is biased into contact with a cam fixed to the control shaft, and rotatable therewith, whereby the housing lock is operable by rotation of the control shaft.

Preferably, the slider is prevented from leaving the blocking position when the plunge cut mode is selected by the control button. This isolates the housing lock by shielding the dowel's leading end with the slider. Risk of overriding proper functioning of the interlock by deliberately jamming the dowel against the housing or the foot plate is thereby prevented.

Preferably, the slider has a manually operable push button which blocks operation of the control shaft when the slider is the blocking position. This also isolates the housing lock and provides further means for ensuring proper functioning of the interlock.

Preferably, the control button is prevented from selecting the plunge cut mode when the slider moves from the blocking position. This provides still further means for ensuring proper functioning of the interlock.

Preferably, the interlock comprises a spindle lock for locking the blade against rotation, wherein the spindle lock is operable by the control shaft after operation of the housing lock. The spindle lock is only used when the blade change position has been adopted and a blade change operation is desired. The spindle lock immobilizes the blade against rotation to enable efficient detachment. The spindle lock is inoperable prior to operation of the housing lock thereby ensuring that energization of the motor is prevented and that the blade and housing are locked in situ. When a blade change operation is complete, the housing and spindle locks can be released and the housing and the blade can return, through upward bias of a plunge spring, to the parked position.

Preferably the one of rotation or displacement of the control shaft overcomes a barrier to operation of the spindle lock. In other words, spindle lock is inoperable until the housing lock has been operated. More preferably, the barrier is a wall that physically blocks operation of the spindle lock by the other of rotation or displacement of the control shaft.

Preferably, the spindle lock comprises a slideable bolt mounted to one of the housing or foot plate and coupled to the control shaft, and a pocket in a spindle arrangement coupled to the blade, wherein the other of rotation or displacement of the control shaft causes engagement between the bolt and the pocket thereby operating of the spindle lock. The term spindle arrangement is used to describe the group of components used to transmit the motor's driving rotation to the blade, like, for example, a motor spindle, a gear box, a main spindle, and a coupling. The spindle arrangement has a spindle plate which typically comprises the pocket. Engagement of the bolt with the pocket immobilizes the whole spindle arrangement, as well as the motor and the blade.

Preferably, the power tool is a plunge-cut circular saw, wherein the tool housing is pivotably mounted to the foot plate and the blade is a circular saw blade, wherein the blade is shielded by a guard while the housing is in the blade change position or the parked position. Alternatively, the power tool is a router, wherein the tool housing is displaceably mounted to the foot plate and the blade is a router bit.

The foot plate is for use with a guide positioned upon a work-piece. The guide has a rail extending in the longitudinal direction of the guide on its upper side. In the case of a plunge-cut circular saw, the footplate has on its lower side channel for engagement of the rail, so that the tool may be positioned on the guide and guided along the rail when the rail engages the channel. In the case of a router, the footplate may be coupled to a guide member with a channel for engagement of the rail.

BRIEF DESCRIPTION OF THE DRAWINGS

An embodiment of the invention will be described with reference to the drawings, in which.

DETAILED DESCRIPTION OF THE INVENTION

Figure 1:
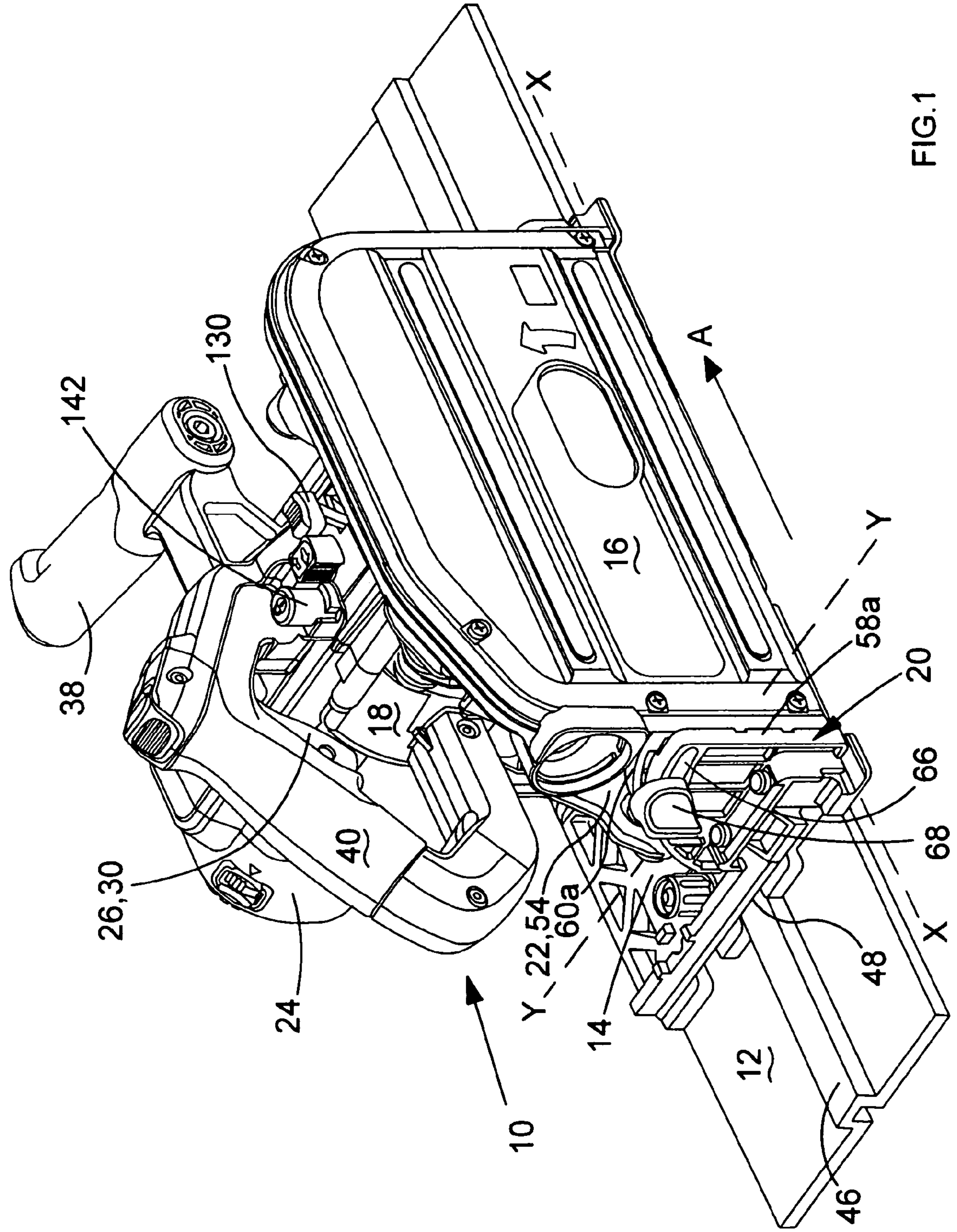
FIG. 1 is a perspective view of a plunge-cut circular saw upon a guide.
Figure 2:
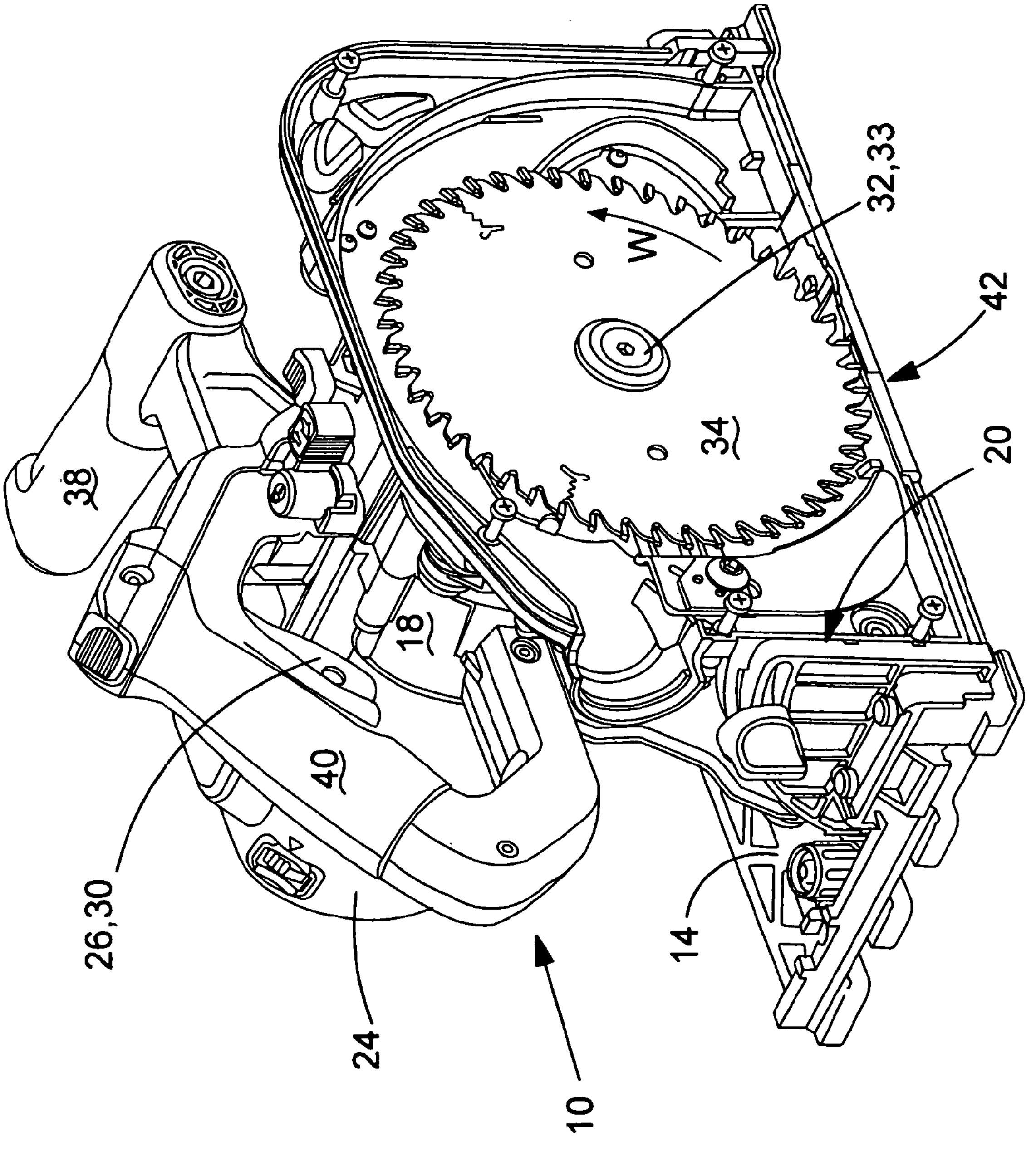
FIG. 2 is a perspective view of the saw with its blade exposed at one side.

Referring to FIG. 1 to 4, a hand-held tool in the form of a plunge-cut circular saw 10 is designed to slide along a guide 12. The saw comprises a foot plate 14, a blade guard 16 and a housing 18. The housing is pivotally mounted to the guard at a bevel hinge 20. The guard is pivotally mounted to the foot plate at a plunge pivot 22. The housing has an electric motor 24 connected, via and on-off switch 26, to a power source (not shown). The manually operable on-off switch has a switch button 30. The motor's driving rotation is transmitted via a motor spindle 31, a gear box, a main spindle, and a coupling 32. These transmission components are collectively called a spindle arrangement 33. The motor is coupled to the spindle arrangement via the motor spindle. A circular saw blade 34 is coupled to the spindle arrangement via the coupling.

Figure 5A:
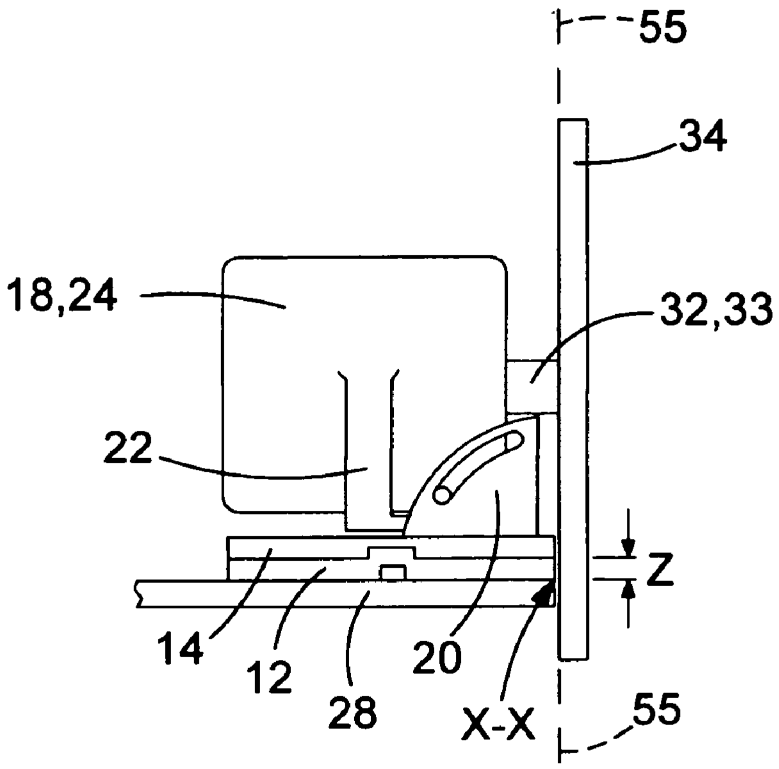
FIGS. 5A & 5B are schematic views of the saw with its blade performing a straight cut and a bevel cut.
Figure 5B:
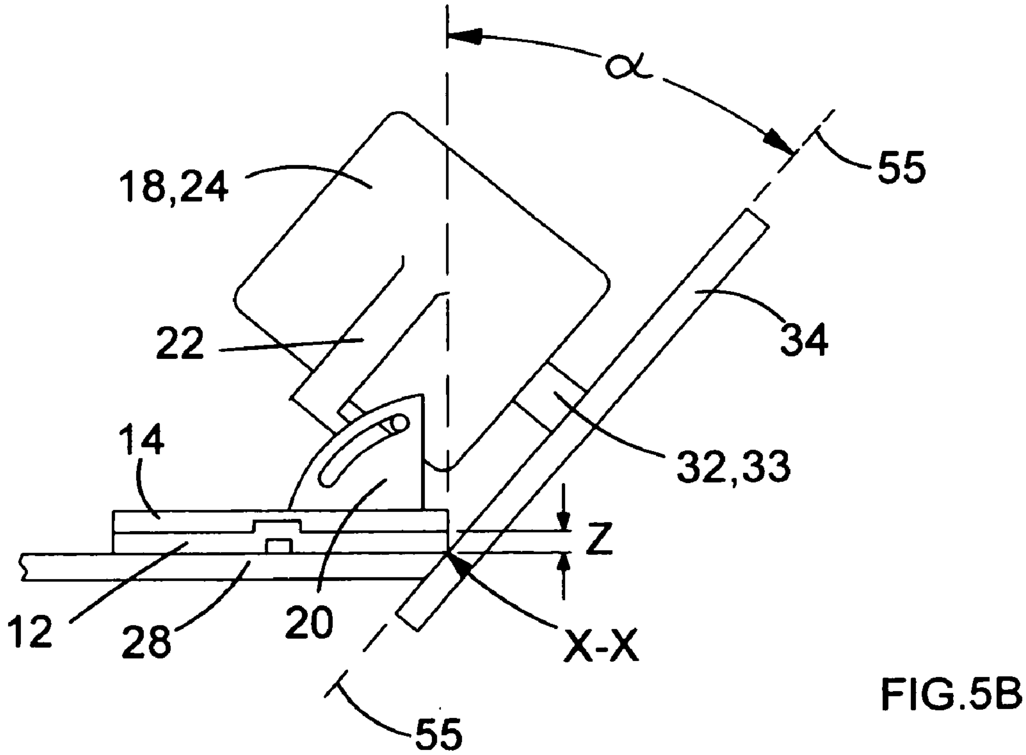

Referring to FIGS. 5A and 5B, the bevel hinge 20 is so-called because it enables bevel cutting by the blade. This is when the housing 18, blade 34 and guard 16 pivot relative to the foot plate 14 about an axis X-X which is parallel to the direction of cut A of the blade. This allows the inclination of the blade to be varied between a plane orthogonal to the foot plate, to perform so-called "straight cuts", (bevel angle $\alpha$=0°) and any predetermined oblique plane, to perform so-called "bevel cuts" (bevel angle $\alpha$ greater than 0° up to 47°).

Figure 6:
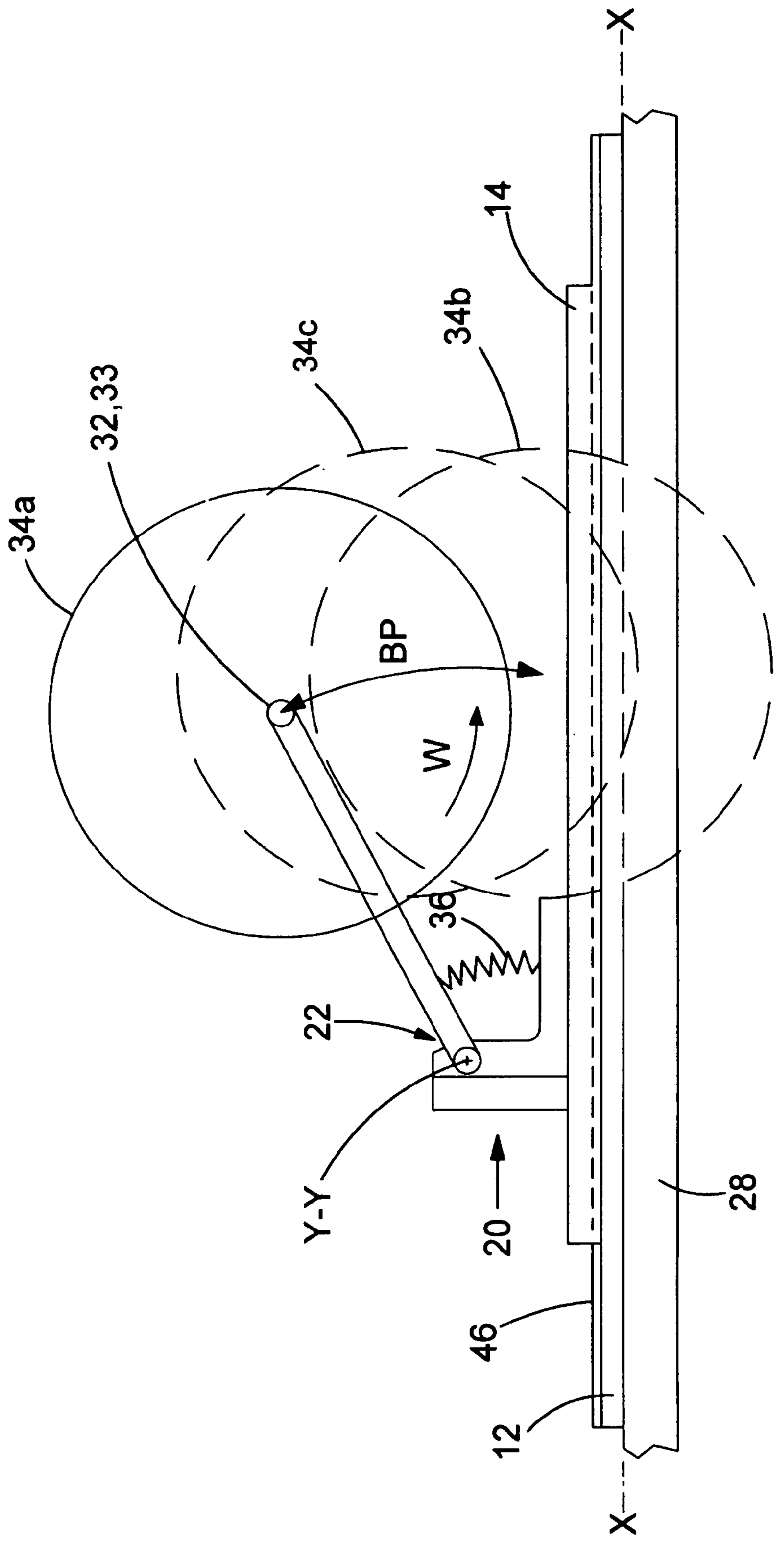
FIG. 6 is a schematic view of the saw with its blade moving between a "parked position" and a "blade change position" or a "plunged position"

Referring to FIG. 6, the plunge pivot 22 is so-called because it enables the blade 34 to descend, or "plunge", into a work piece 28. The housing and blade can pivot relative to the foot plate and the guard about an axis Y-Y perpendicular to axis X-X. The housing is biased to pivot upwards and away from the foot plate by a plunge spring 36 so that the blade is normally retracted within the guard i.e. the blade is in the "parked" position 34*a* where it is shielded by the guard. The housing may be manually moved, via a front handle 38 and a rear handle 40, against the bias of the plunge spring to pivot downwards and towards the foot plate. The blade protrudes through an aperture 42 on the underside of the guard and the foot plate i.e. the blade is in the "plunged" position 34*b* where it is able to cut into the work piece. Alternatively, the blade may stop part way between parked and plunged positions at a "blade change" position 34*c*.

In use, the blade rotates in the direction of arrow W. Viewed from one end, the centre of the blade follows an arc-shaped path BP as the blade pivots about the plunge pivot between parked and plunged positions. The housing also follows an arc-shaped path corresponding to path BP. The exact length of path BP, and thus the depth of cut of the blade in the plunged position, is determined by a depth-stop mechanism 44. The bevel hinge, the plunge pivot and the depth-stop mechanism are discussed in more detail below.

Returning to FIG. 1, the guide has a straight rail 46 on its upper surface and the foot plate has a correspondingly-shaped middle channel 48 in its lower surface. The rail is accommodated within the middle channel when the foot plate is on the guide. The saw can be pushed forwardly, again via the handles, so that the foot plate slides along the guide in a straight line determined by the rail. The blade cuts a straight line in the work piece in the direction of cut A. The guide is made of strong material, like, for example, metal. Sliding motion is assisted by low-friction strips on the upper surface of the guide.

Returning to FIG. 4, the plunge pivot 22 is a double swing-arm hinge like the one disclosed by DE 196 35 527. The plunge pivot comprises a lower arm 52 and an upper arm 54. Both arms link the housing to the rear of the guard. The lower arm is pivotally mounted to the guard at a point directly beneath where the upper arm is pivotally mounted to the guard. The two arms are the same length. The lower arm is pivotally mounted to the body at a point directly beneath where the upper arm is pivotally mounted to the body. Thus, the orientation of the housing 18 in relation to the foot plate 14 remains constant when it moves towards the base plate.

Figure 3:
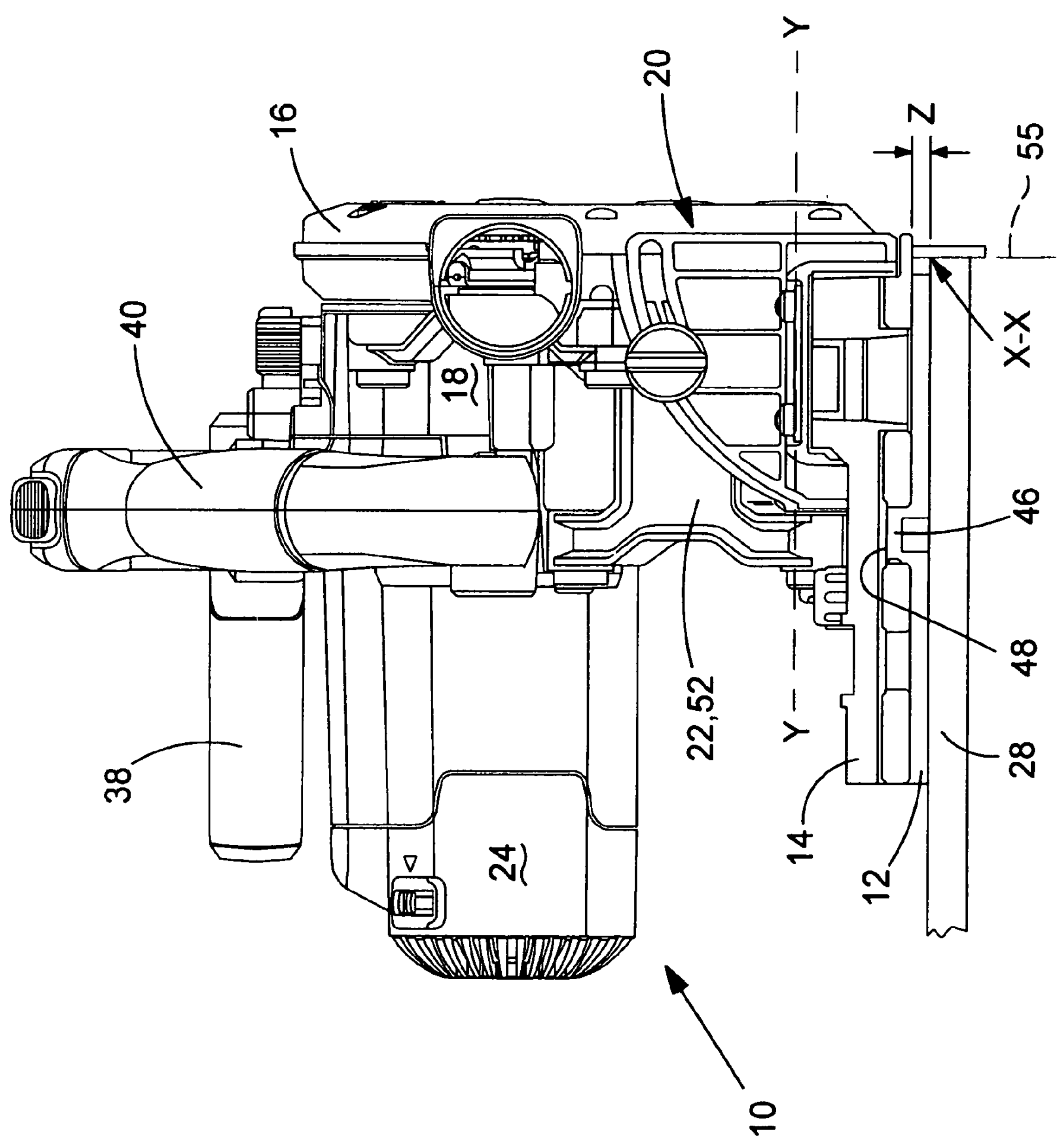
FIG. 3 is a rear end view of the saw and the guide.
Figure 4:
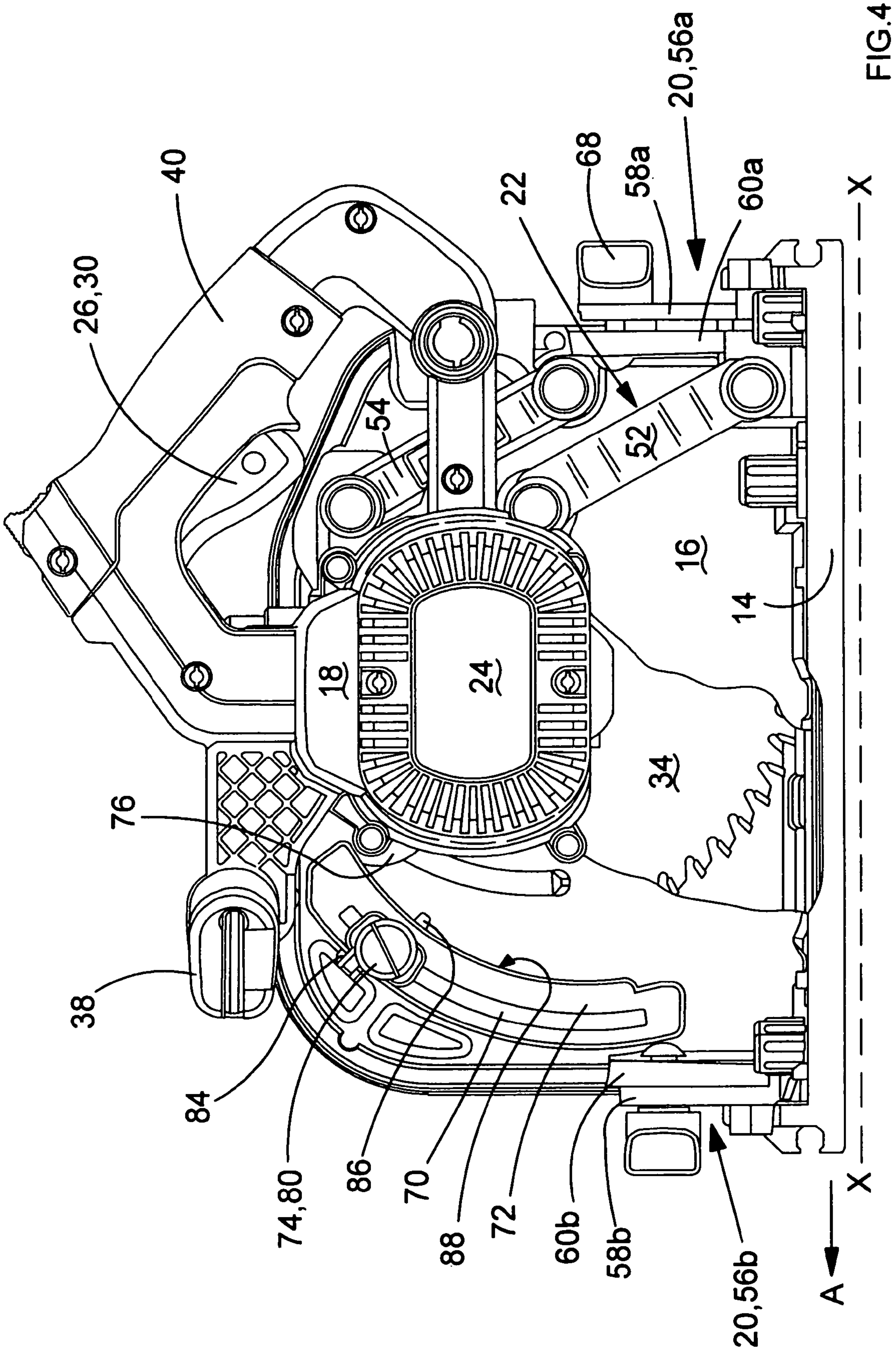
FIG. 4 is a side view of the saw.

Referring to FIGS. 3, 5A and 5B, the bevel hinge 20 has a virtual pivot axis X-X like the one disclosed by EP0247417. The virtual pivot axis is in the inner blade plane 55 and is located a distance Z below the foot plate equal to the thickness of the guide. This ensures that the blade engagement line, which is determined by the intersection of the inner blade plane with the very top of the work piece 28, and which coincides with the virtual pivot axis, maintains its position with respect to the work piece, whether straight or bevel cuts are performed.

Figure 7:
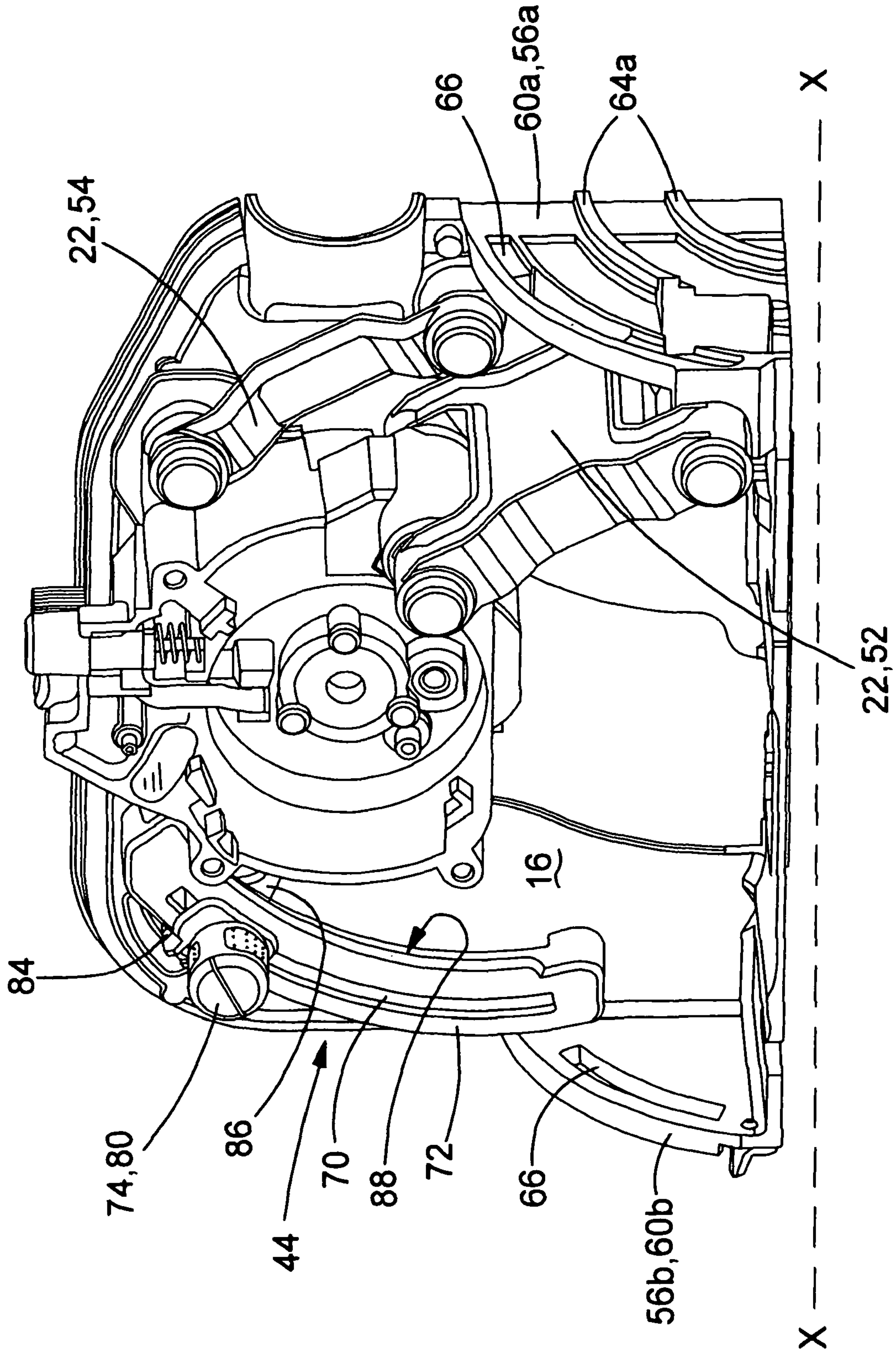
FIG. 7 is a perspective view of part of a bevel hinge and a plunge pivot.
Figure 8:
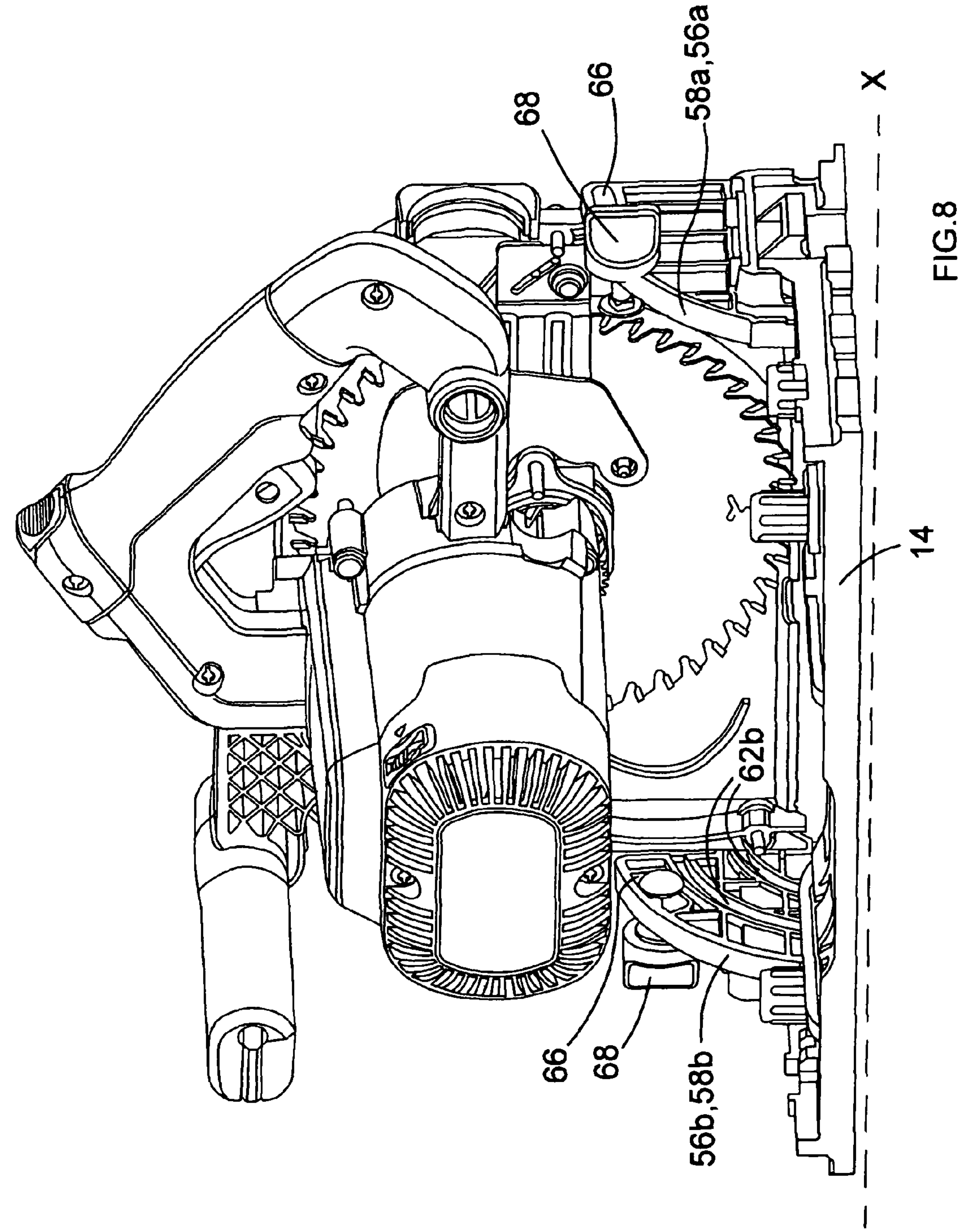
FIG. 8 is a perspective view of the saw without the parts shown in FIG. 7.

Referring to FIGS. 7 and 8, the bevel hinge 20 comprises two hinges 56*a*, 56*b*. The hinges oppose each other and are set apart in the direction of cut A. Each hinge comprises an outer hinge part 58*a*, 58*b* fixed to the foot plate 14 and an inner hinge part 60*a*, 60*b* which is integral with the guard 16. Each outer hinge part has a pair of circular arc grooves 62*a*, 62*b*, the centre points of which coincide with the virtual pivot axis. Each inner hinge part has a pair of arcuate tongues 64*a*, 64*b* accommodated within the circular arc grooves 62*a*, 62*b* in which they slide, with centre points which coincide with the virtual pivot axis. The arc of the bevel hinge 20 sweeps from straight cut to maximum bevel cut.

The inner and outer hinge parts have facing circular arc slots 66, the centre points of which also coincide with the virtual pivot axis. Each hinge 56*a*, 56*b* has a bolt and thumb screw arrangement 68 through its circular arc slots. Manual loosening of both thumb screws unfastens the bolts so that the tongues are free to slide within the grooves and allow the blade to pivot about the virtual pivot point, and vice versa.

Figure 9A:
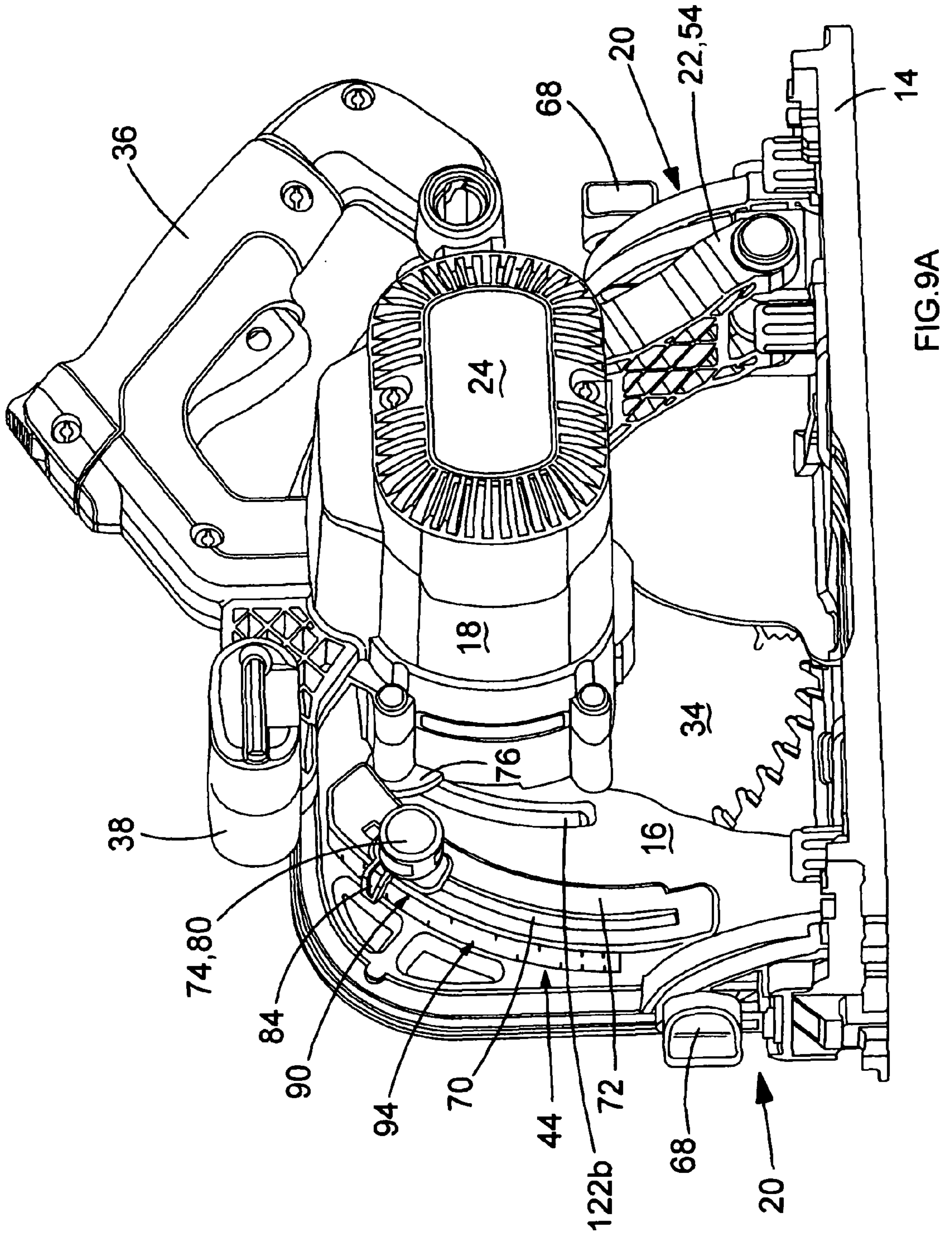
FIG. 9A is a perspective view of the saw showing its depth stop mechanism.

Referring to FIGS. 7 and 9A, the depth stop mechanism 44 comprises a circular arc groove 70 in a curved molding 72 fixed to the guard, a stop assembly 74 slidably mounted in the circular arc groove and a finger 76 protruding from the housing.

The stop assembly 74 has a flange (not shown) on the interior of the molding and a manually operable thumb screw 80 passing through the circular arc groove 70 to engage a threaded hole in the flange. The bolt also passes through a carriage with a needle 84 located between the thumb screw and the molding. Loosening of the thumb screw unfastens the flange from the interior of the molding until the stop assembly is free to slide within the groove, and vice versa. The flange has a finger 86 protruding though an elongate slit 88 on the inner curved side of the molding. The flange's finger 86 is located within in the arcuate path of the housing's finger 76 as the blade and housing move from the parked position to the plunged position. Thus, the stop assembly determines the depth to which the blade can cut a work piece because the flange's finger limits the depth to which the housing can be plunged.

Figure 9B:
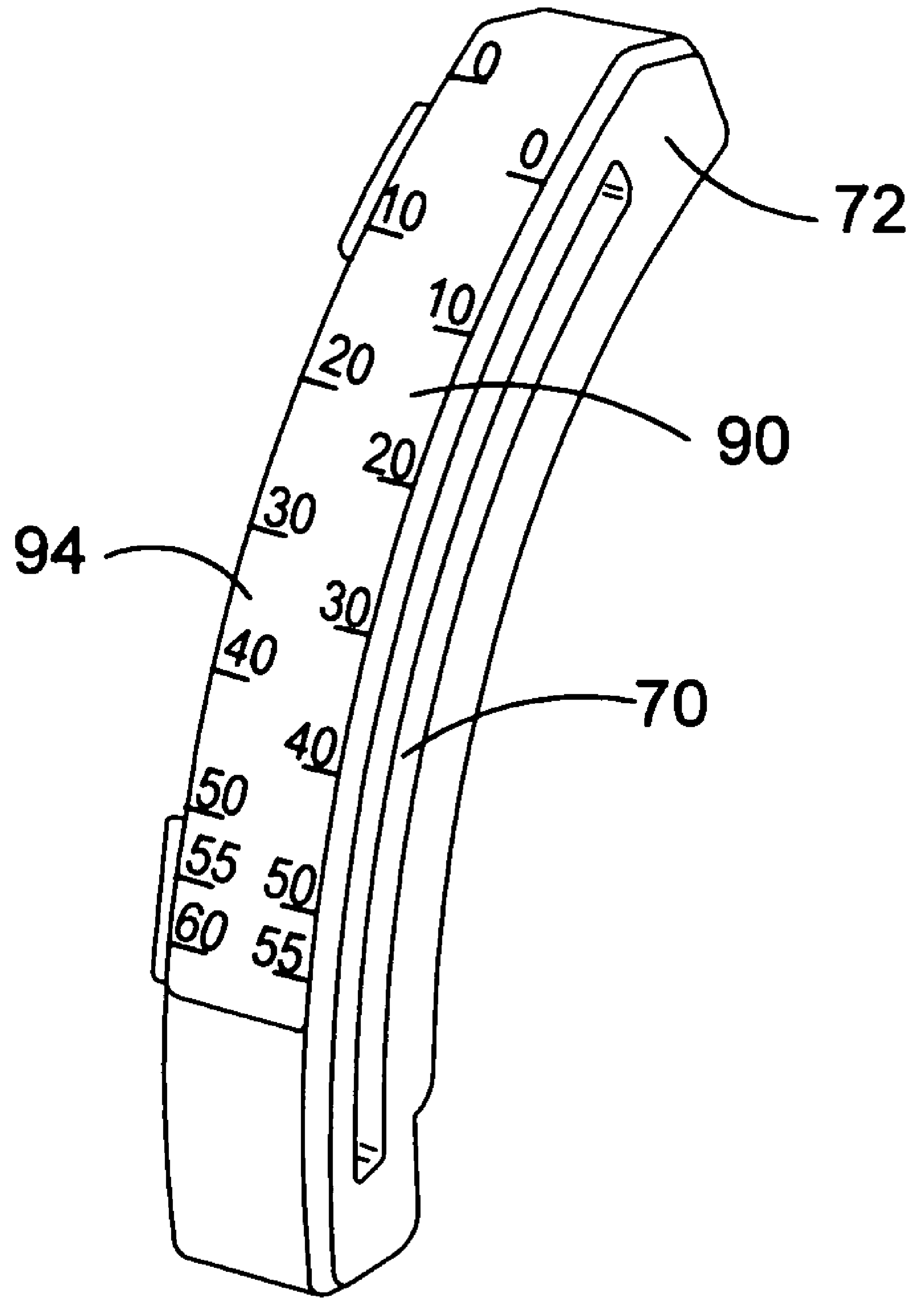
FIG. 9B shows a main and alternative scale in detail.
Figure 10:
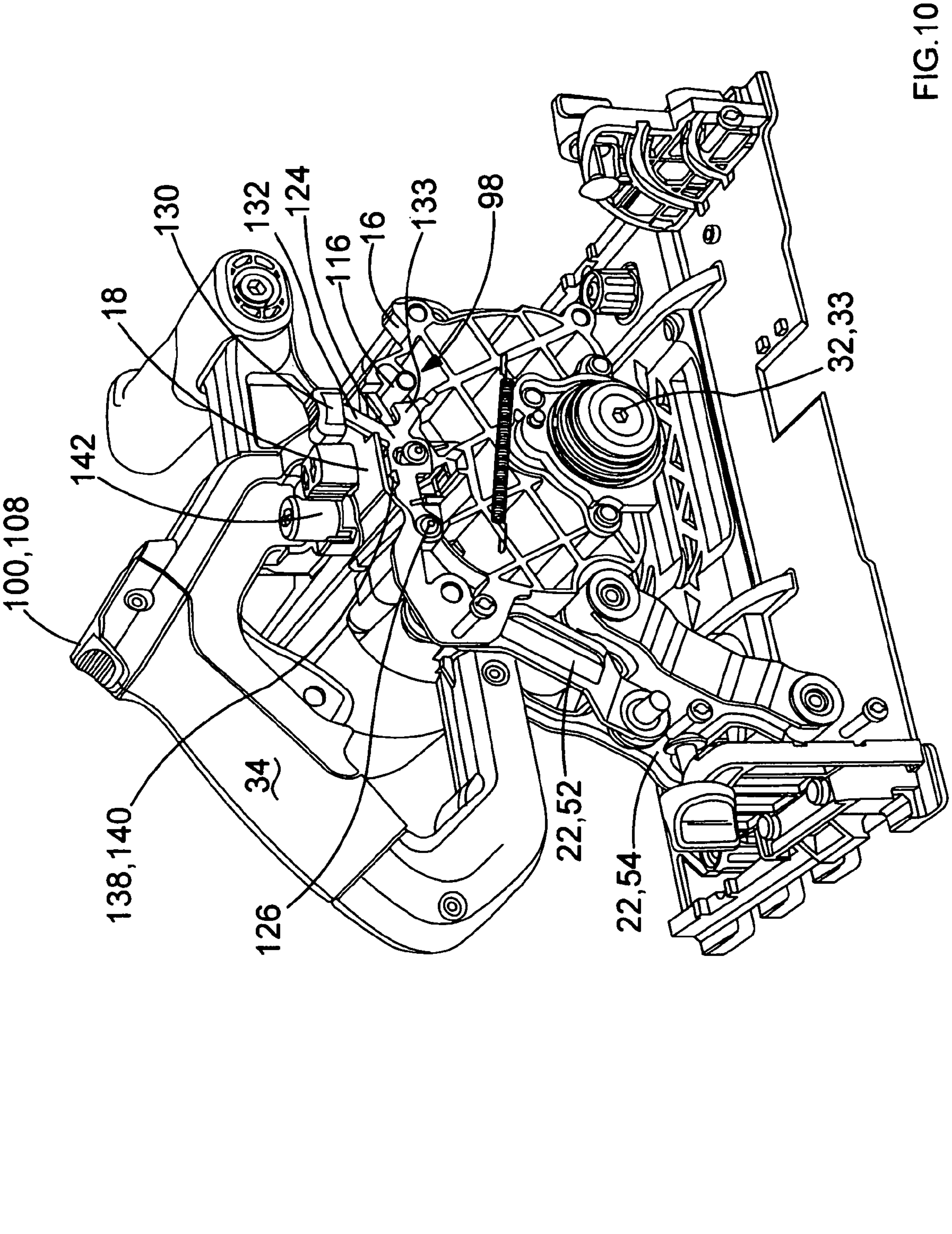
FIG. 10 is a perspective view of the saw without blade and guard.
Figure 11:
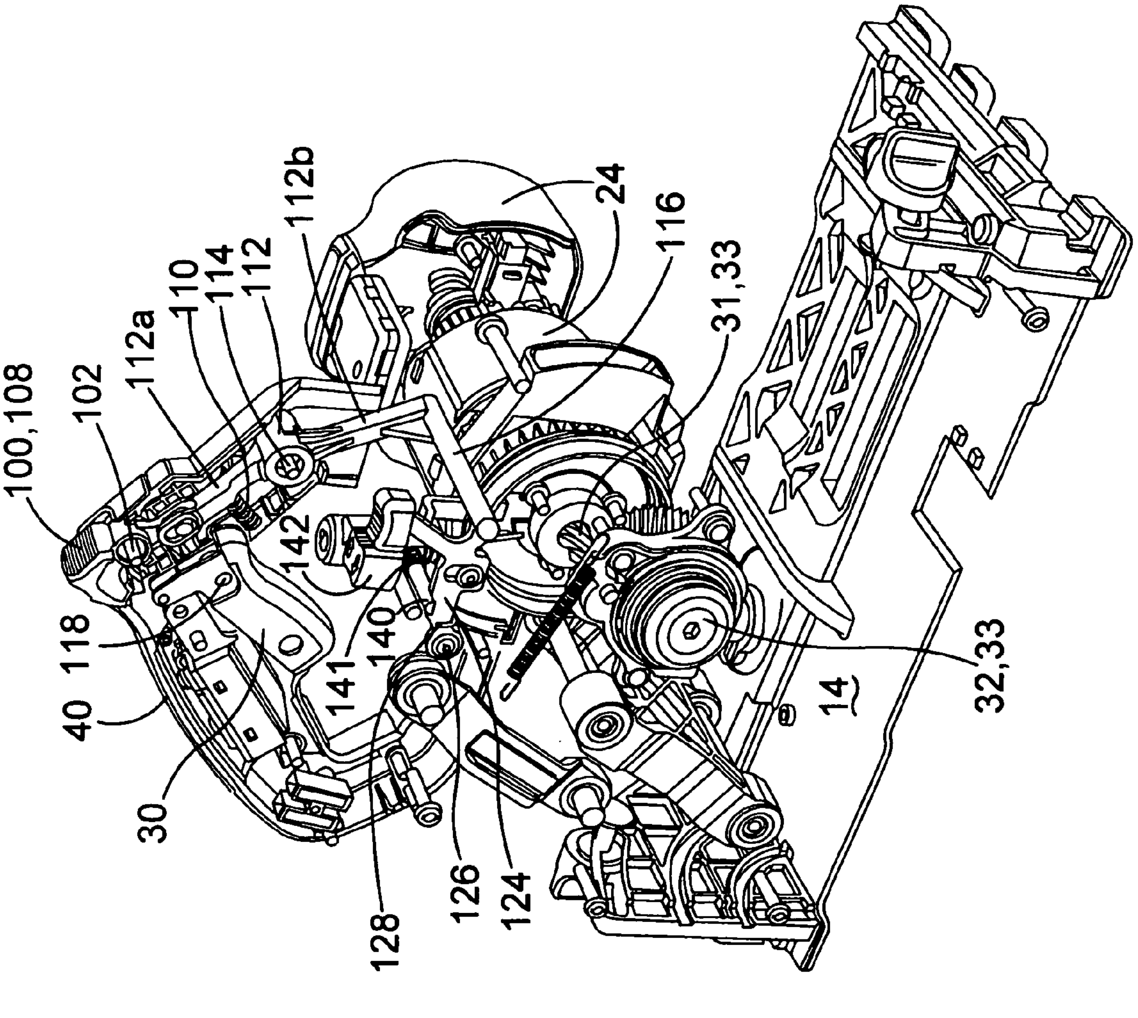
FIG. 11 is a perspective view of the saw without the blade, guard, housing and half a handle.
Figure 12:
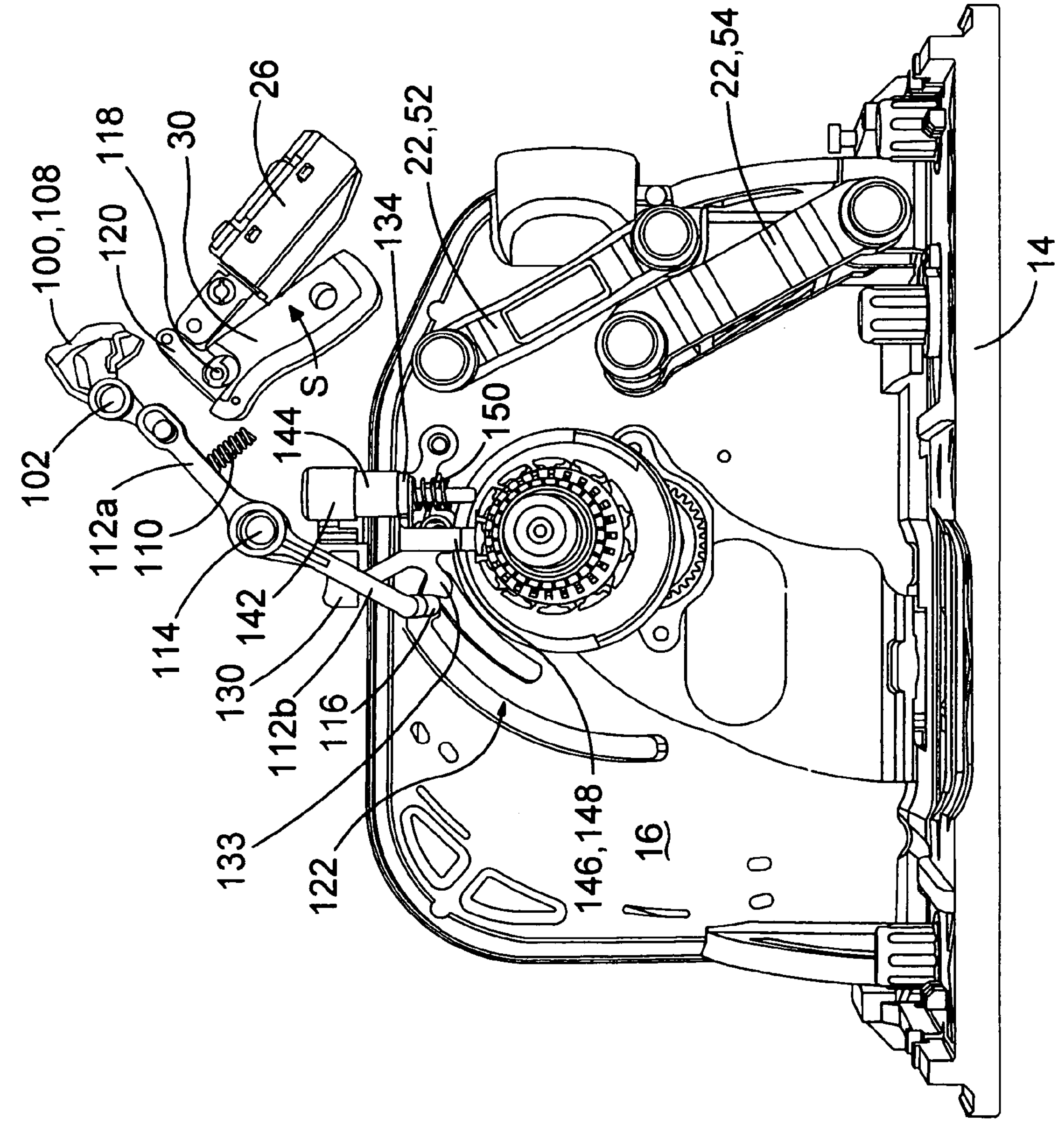
FIG. 12 is a side view of the saw without the blade, housing and handles.
Figure 13:
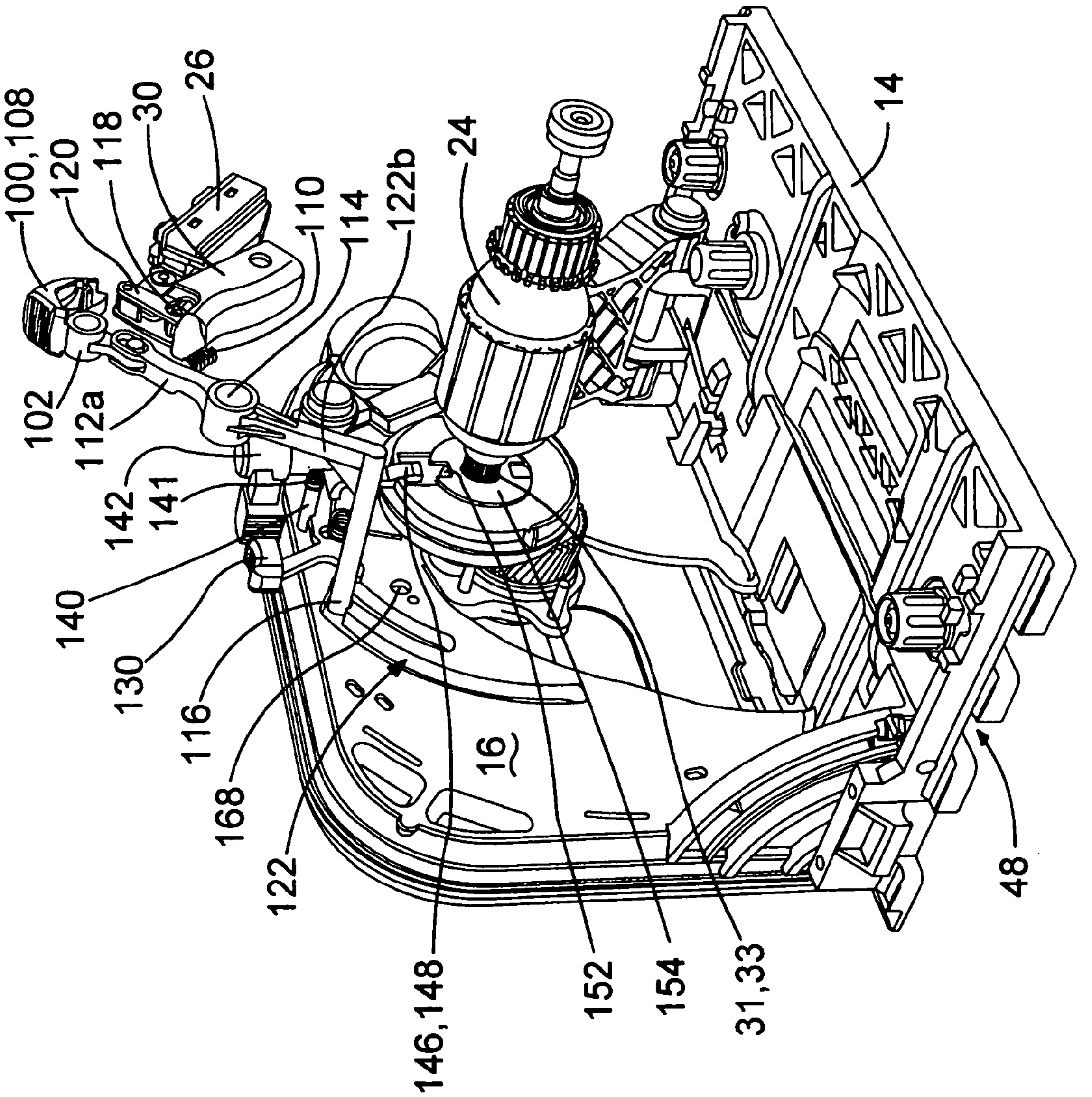
FIG. 13 is a perspective view of the saw in FIG. 12.
Figure 14:
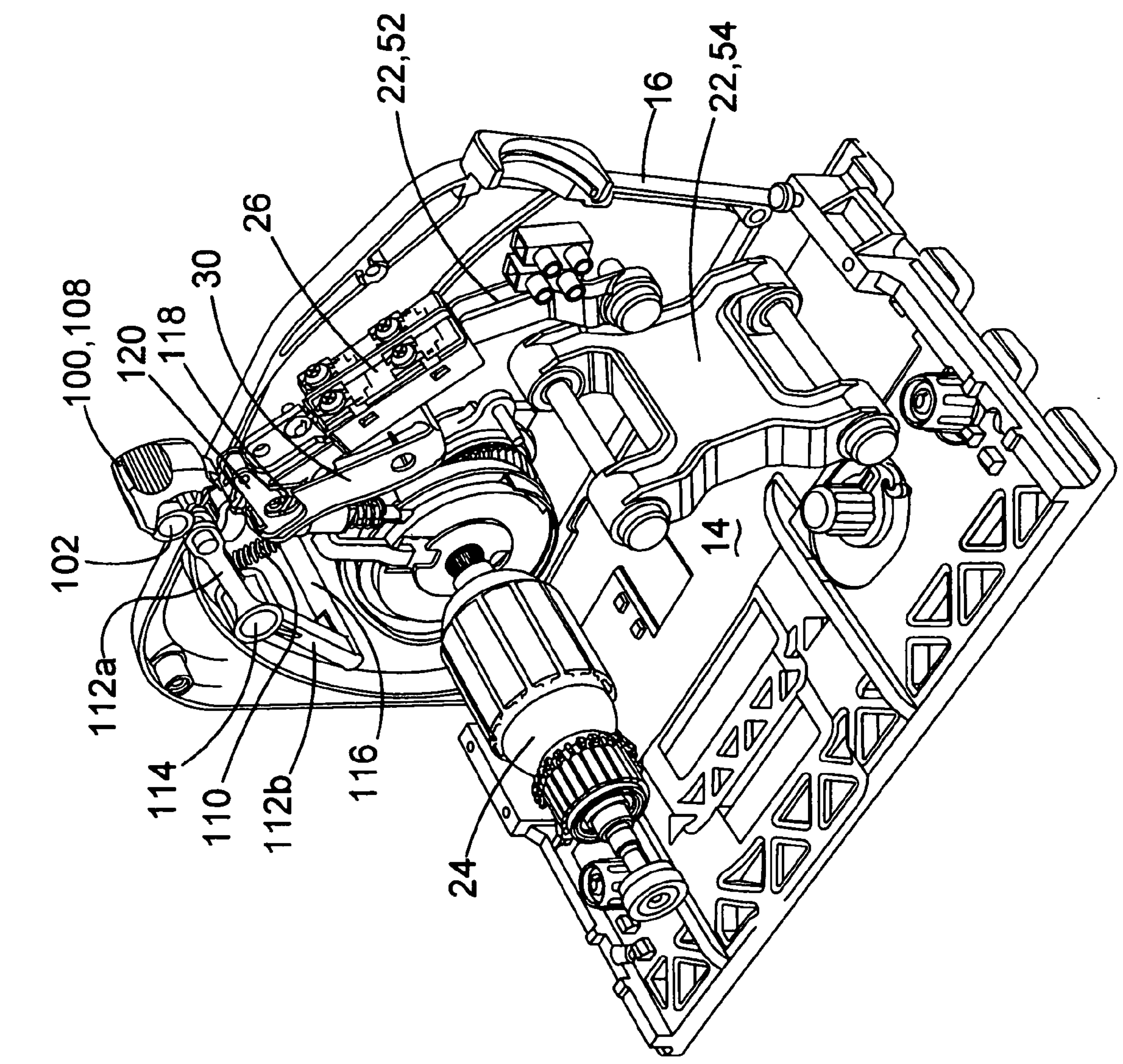
FIG. 14 is a perspective view of the saw in FIG. 12 turned through 90° in relation to FIG. 13.

Referring to FIG. 9B, the depth stop mechanism 44 further comprises a main scale 90 on the outer curved side of the molding. The needle 84 points at the main scale. Blades used on the saw always have the same diameter and the guide rail's thickness does not change. Thus, the needle's position on the scale main indicates the maximum blade's depth into a work piece as permitted by the depth stop mechanism i.e. the blade's depth-of-cut when the housing's finger abuts the flange's finger and when movement of the blade any further into the plunged position is arrested. For example, when the needle points to 0 the blade cannot cut into the work piece. When the needle points to the number 45 the blade can cut up to a maximum of 45 mm deep into the work piece.

Sometimes, a plunge-cut circular saw is used as a regular circular saw i.e. the foot plate is placed directly upon a work piece, instead of on the guide. In this case, the blade will cut into the workpiece sooner than it would do if the guide was present. Thus, an alternative scale 94 accompanies the main scale on the outer curved side of the molding. The needle also points at the alternative scale. The alternative scale is shifted upward by an amount equivalent to the thickness of the guide so that needle arrives at the 0 mark sooner than it does for the main scale. This compensates for earlier cutting into the work piece as the blade is moved into the plunged position.

The arcuate path of the housing, and therefore the path of the housing's finger, traveling between parked and plunged positions, are determined by the plunge pivot 22 and thus correspond to the arc-shaped path BP of the coupling 32. Initially, angular travel along this path results in relatively shallow increase in the blade's depth of cut because it is at the top of its arc. Naturally, the rate of increase in the blade's depth of cut accelerates as this path approaches the side of its arc. This is reflected in both the main scale and the alternative scale where the graduations are increasingly compressed as the path of the housing's finger approaches the side of its arc.

An interlock 98 controls the conditions under which the housing moves about the plunge pivot and relative to the foot plate. The interlock does not interact with the bevel hinge.

Figure 15A:
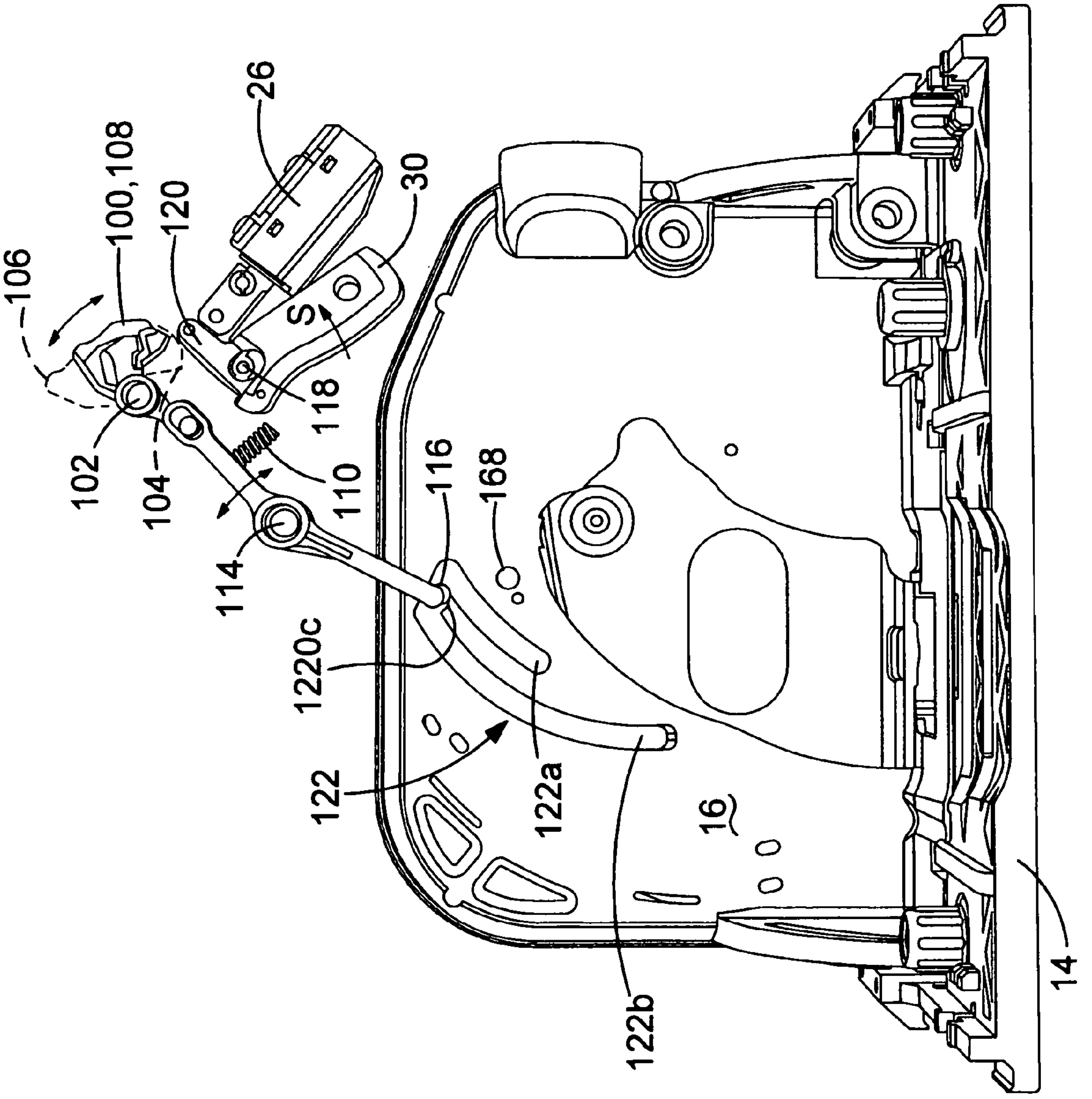
FIGS. 15A to 15C show different operation stages of an interlock for controlling blade movement.
Figure 15B:
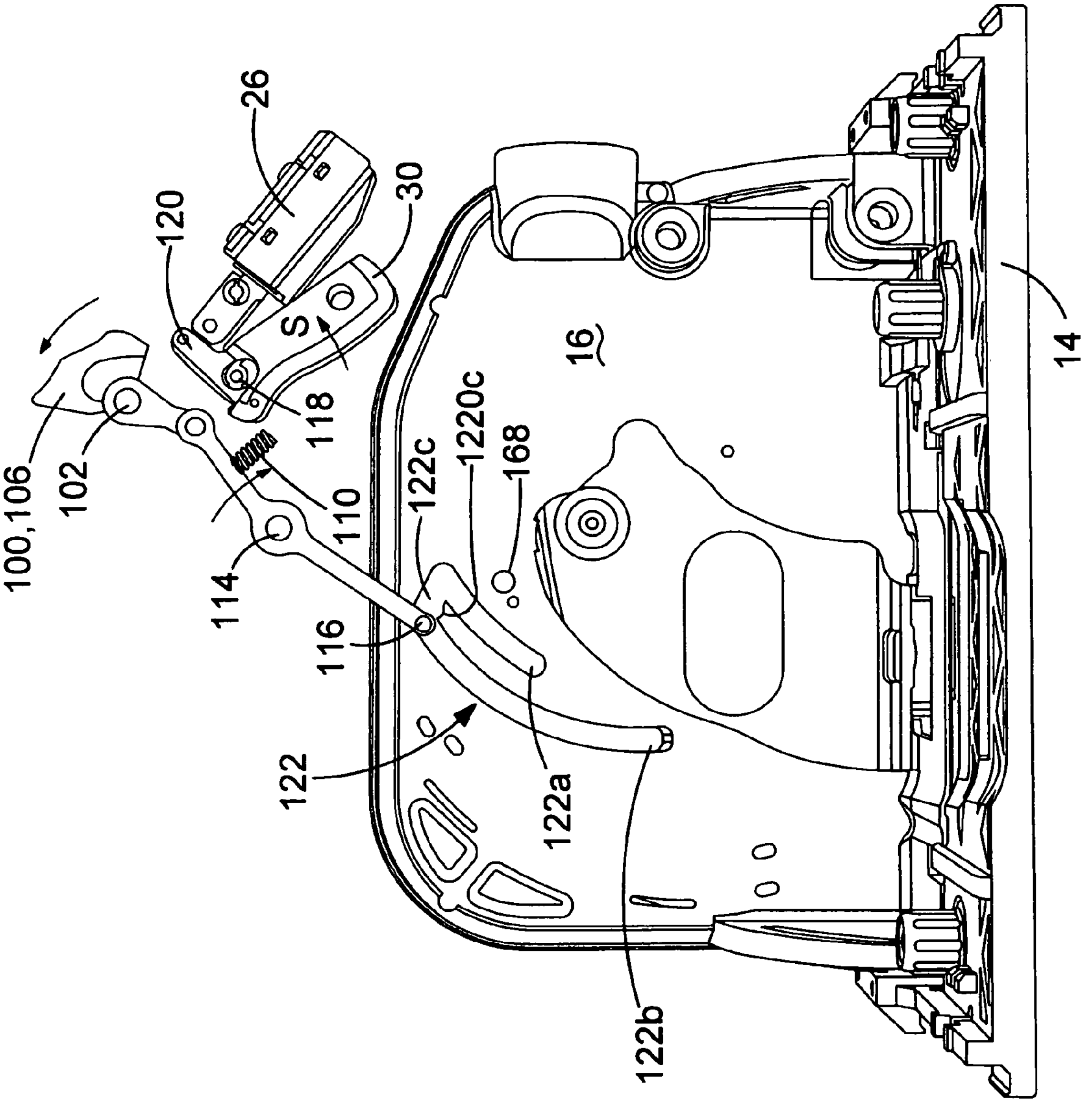
Figure 15C:
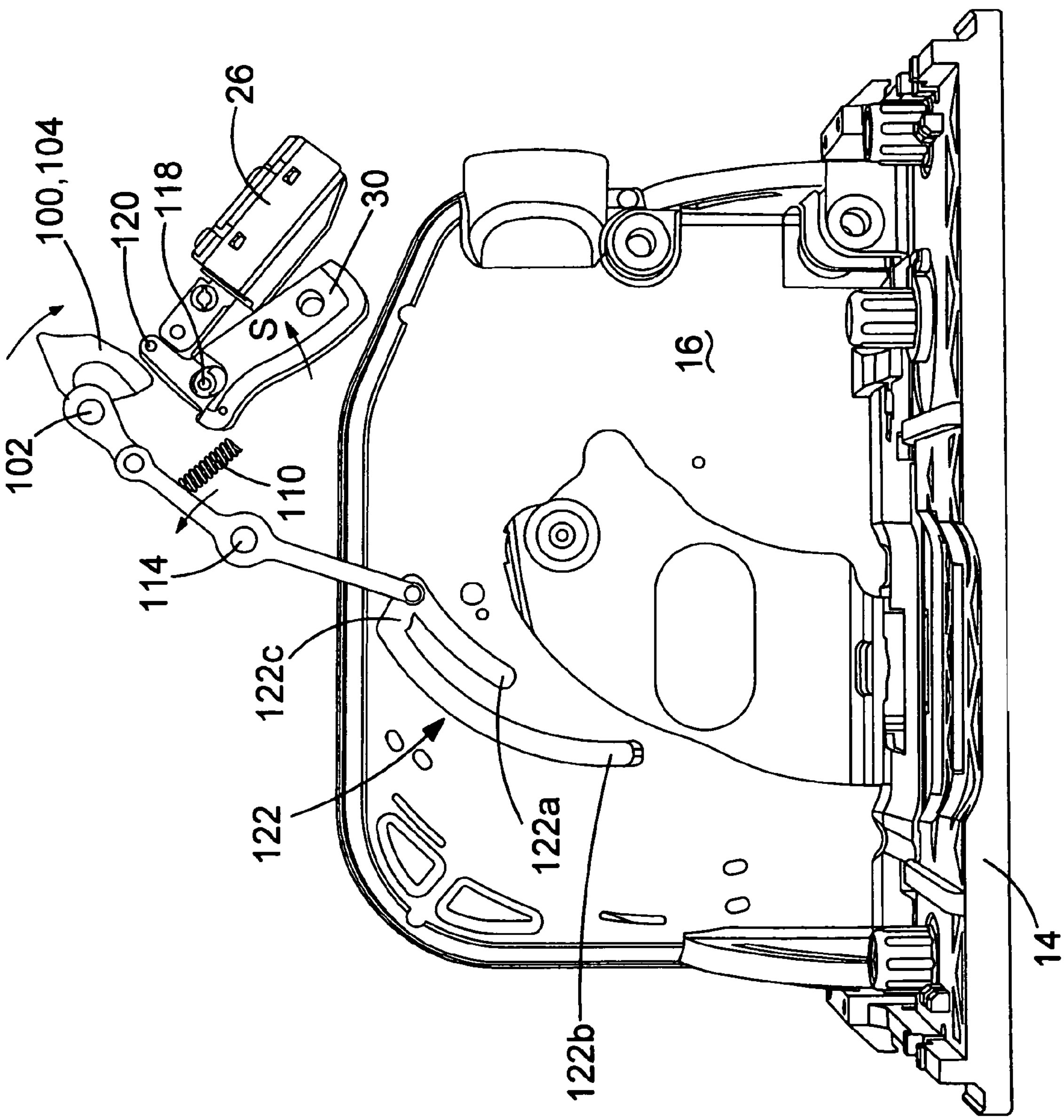

Referring to FIGS. 15A to 15C, the interlock comprises a control button 100 which can be pivoted clockwise about a control button axis 102 into a "blade change" mode position 104, or, alternatively, counter-clockwise about the control button axis into a "plunge cut" mode position 106. When no force is exerted, either clockwise or counter-clockwise, the control button is biased to return to a central, or "parked", mode position 108 by a primary spring 110.

Referring to FIGS. 10 to 14, the interlock comprises a control arm 112 which is pivotally coupled at one end to the control button and pivotally mounted in the middle to an arm axis 114. The control button axis is fixed to the rear handle 40 of the housing 18. The arm axis is fixed to another part of the housing. The arm is in two portions: an upper arm portion 112*a* between the control button and the arm axis, and a lower arm portion 112*b* between the arm axis and a control pin 116 at the free end of the arm.

The switch button 30 is pivotally mounted upon a switch axis 118 fixed to the rear handle 40. The switch is biased open to disconnect the power source from the motor 24. When the switch button is depressed it pivots counter-clockwise in direction S and closes the on/off switch 26 to connect the power source to the motor, as is shown in best FIG. 12. When the switch button is released it pivots clockwise, the switch re-opens and the motor is disconnected from the power source.

The switch button has a finger 120 which pivots about the switch axis 118 with the switch button. In certain circumstances, the control button blocks the finger's path of pivotal movement so that the switch button cannot be depressed and the motor cannot be energized by the off/off switch. For example, the switch button cannot be depressed when the control button is in the blade change mode position 104, as is shown in FIG. 15C.

However, when the control button returns to the parked mode position 108, as is shown in FIG. 15A, or the control button has been pivoted counter-clockwise into the plunge cut mode position 106, as is shown in FIG. 15B, the control button does not block movement of the finger 120. Thus, the switch button can be depressed and the motor can be energized.

Optionally, a minor modification to the shape of the control button 100 can change this scenario so that the control button blocks the finger's path of pivotal movement in all but the plunge cut mode position.

The tip of the pin 116 slides within an up-side-down U-shaped channel 122 formed in the side of the guard 16. The pin 116 is part of the interlock and all but the tip of the pin is located inside the housing. The path selected for the pin 116 determines the extent to which the housing and the blade may move in relation to the guard and the foot plate. The channel includes three sections: a minor leg 122*a*; a major leg 122*b* and a web 122*c* joining the upper ends of the major and minor legs.

The blade is normally in the parked position 34*a* and the control button 100 is in the parked mode position 108, as is shown in FIG. 15A, under the bias of the primary spring 110.

The control button can be pivoted counter-clockwise into the plunge cut mode position, as is shown in FIG. 15B. The arm pivots about the arm axis in a clockwise direction and against the bias of the primary spring 110. The pin leaves the web and enters the major leg 122*b* of the channel. The switch button can be depressed to energize the motor and rotate the blade. The blade can be moved from the parked position 34*a* (the pin at top end of the major leg) towards the plunged position 34*b* (the pin at bottom, or blind end, of the major leg) as the pin is freely moveable along the major leg of the channel. The blade and the housing move together, of course.

When the downward force on the handles is relaxed, the blade returns to the parked position 34*a* under the bias of the plunge spring 36. Release of the control button causes it to pivot clockwise into the parked mode position 108 under the bias of the primary spring 110. The arm pivots counter-clockwise about the arm axis. The pin 116 leaves the top end of the major leg of the channel and enters the web. The blade cannot be accidentally moved from the parked position 34*a* as downward movement of the pin is blocked by a lower face 1220*c* of the web.

Optionally, and as best shown in FIGS. 15A to 15C, the lower face 1220*c* is slightly concave-shaped thus providing a small protrusion, or detent, at each point of entry to the web. The detent acts as a gateway to the face which must be overcome prior to cooperation between the pin 116 and the face.

The control button 100 can also be pivoted clockwise into the blade change mode position 104, as is shown in FIG. 15C. The arm pivots counter-clockwise about the arm axis and against the bias of the primary spring. The pin 116 leaves the web and enters the minor leg of the channel. The blade can be moved from the parked position 34*a* (the pin at top end of the minor leg) towards the blade change position 34*c* (the pin at bottom, or blind end, of the minor leg) as the pin is freely moveable along the minor leg of the channel.

Referring to FIGS. 10 to 14, the interlock comprises a slider 124 which is pivotally mounted upon a slider axis 126. The slider is biased into a raised position (as shown) by a slider spring 128. The slider is located in the housing. The slider axis is fixed to the housing. The slider has a manually operable push button 130 connected to the slider via a straight stem 132 protruding outside the housing. The slider has a nose 133 in abutment with the pin 116 when the slider is in the raised position and the control pin 116 is the web 122*c* of the U-shaped channel as is shown best in FIG. 12. Abutment between the nose and the pin blocks the latter from moving into the minor leg 122*a* of the channel and so it prevents unintentional pivoting of the control button into the blade change mode position 104.

The interlock comprises a rotatable slideable control shaft 134 with a manually operable control knob 142 protruding outside the housing. The control shaft is mounted to the housing.

The interlock comprises a housing lock 138 formed by a slideable dowel 140 nested within the housing 18. The dowel is biased away from the guard by a spring 141. The path between the dowel and the guard is partially blocked by the slider when the slider is in a raised position.

Figure 16A:
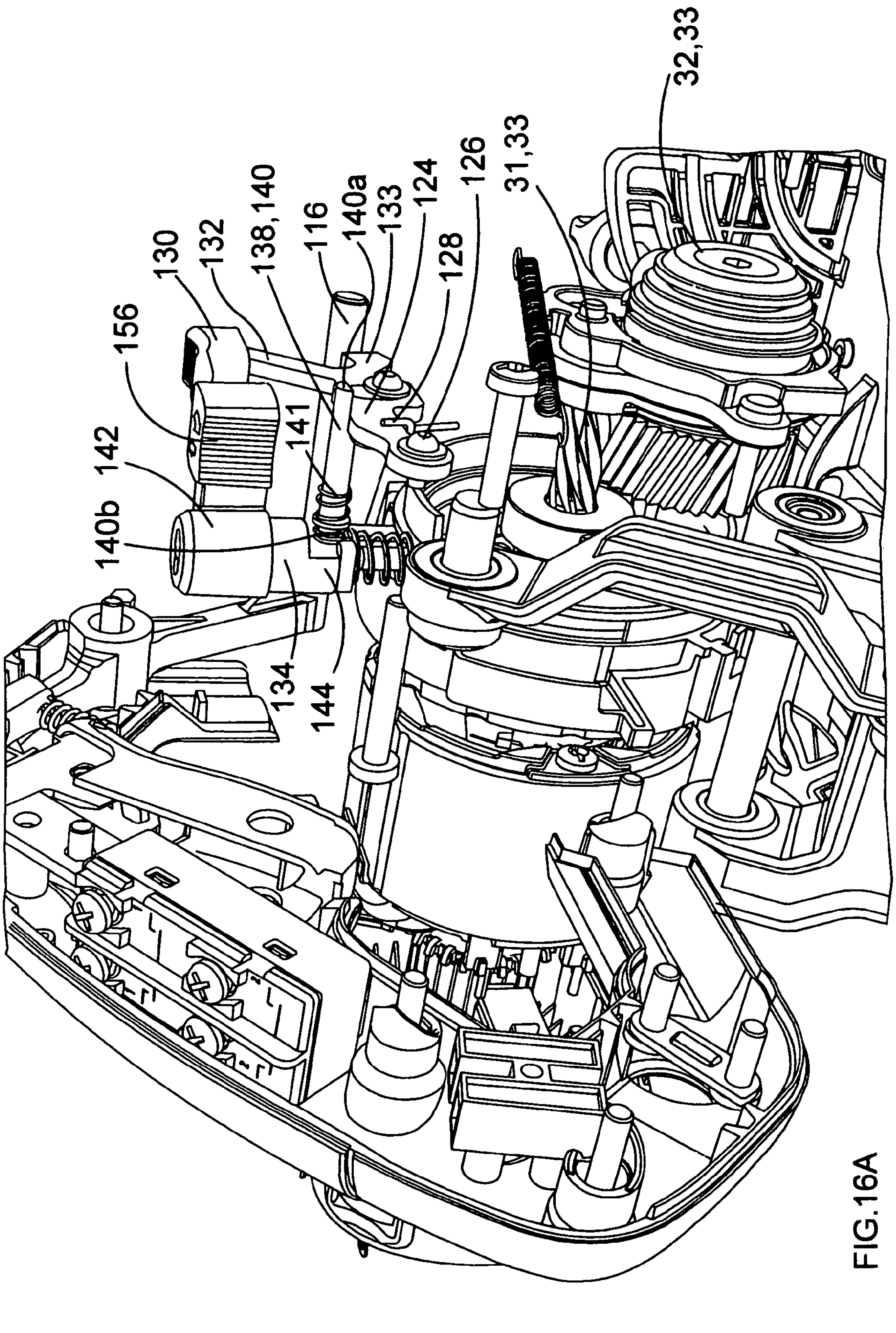
FIGS. 16A to 16C show detail of the interlock, in particular a spindle lock and a housing lock.
Figure 16B:
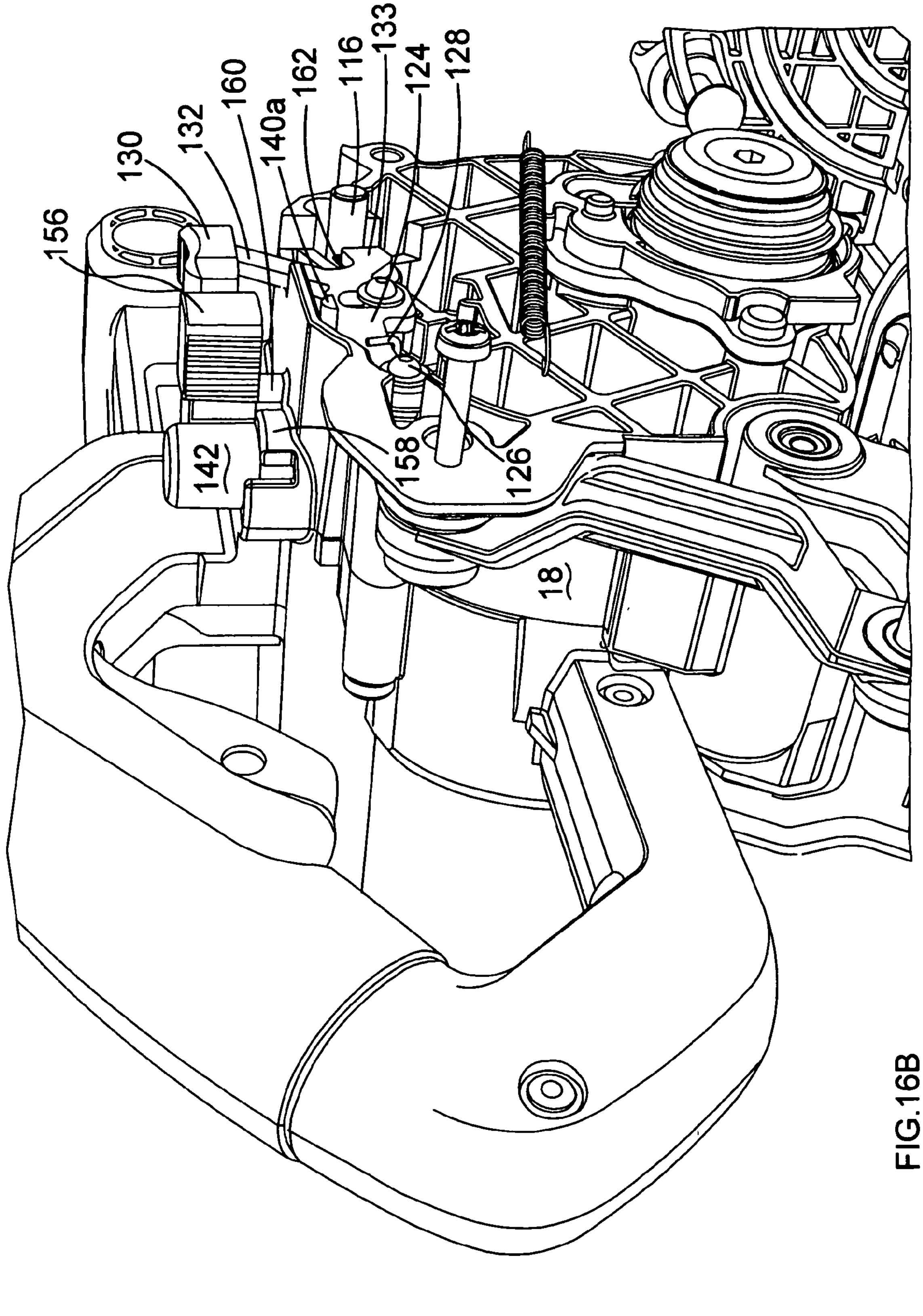
Figure 16C:
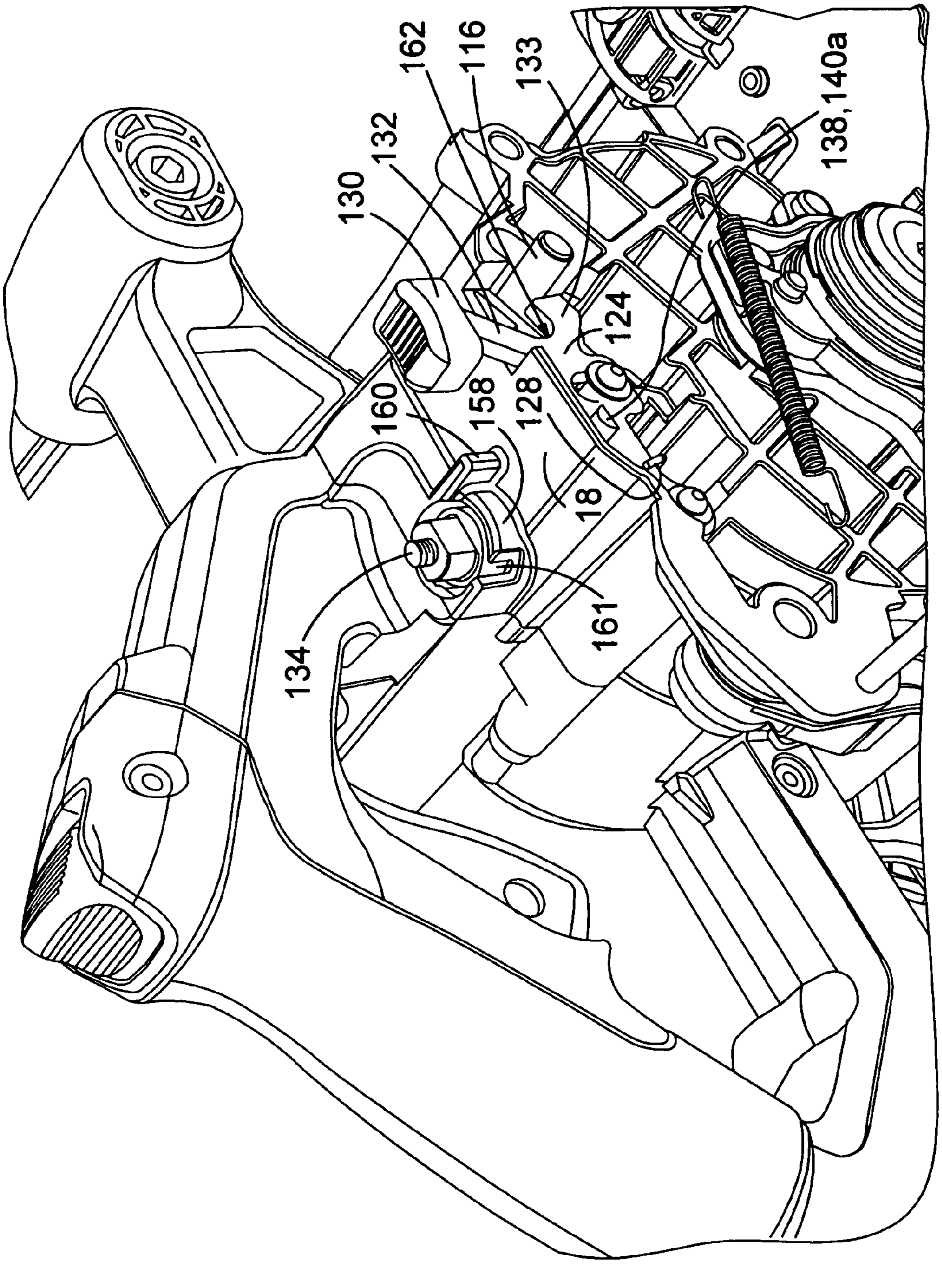

The control shaft 134 has a cam 144 in abutment with the dowel's trailing end 140*b*. The cam is shown in the FIG. 16A in a position where it does not push the dowel towards the guard. Manual clockwise rotation of the control knob through 90 degrees (when viewed from above, like in FIG. 16C) causes corresponding rotation of the cam which pushes the dowel towards the guard. However, this is only possible once the slider is in a lowered position where it does not block the path between the dowel and the guard.

Returning to FIG. 12, the interlock comprises a spindle lock 146 formed by a slideable bolt 148 coupled to the control shaft. The control shaft, control knob and bolt are all upwardly biased by a control spring 150.

Returning to FIGS. 16A to 16C, the control knob has a lever 156 under which a wall 158 on the housing is accommodated when the control knob and the control shaft are in the position shown in all the Figures. The wall blocks the control shaft from sliding downwards into a lowered position.

A stop 160 on the housing limits counter-clockwise rotation of the control knob in the area of the wall. Clockwise rotation of the control knob through approximately 90 degrees leads to a wall-free area 161 where there is nothing to inhibit the control knob from being pushed downward causing corresponding downward movement of the control shaft

134, the cam 144 and the bolt 148. The cam is long enough in an axial direction to maintain abutment with the dowel's trailing end 140*b* during downward movement of the control shaft.

A hook 162 is formed between the nose 133 and the stem 132 of the slider 124. When the push button 130 moves the slider into a downward position the nose moves out of abutment with the pin. The pin is free to move into the minor leg 122*a* of the channel. This allows clockwise rotation of the control button into the blade change mode position 104 which causes the pin to enter the minor leg 122*a* of the channel and, at the same time, approach the mouth of the hook 162. The push button is released and the slider 124 raises slightly under the bias of the slider spring 128 to capture the pin 116 within the hook. Meanwhile, the housing and the blade are free to move from the parked position to the blade change position where the dowel is aligned with a blind recess 168 in the guard. The slider has moved into a downward position which fully unblocks the path of the dowel toward the recess.

Clockwise rotation of the control knob 142 and the cam 144 pushes the dowel's leading end 140*a* into the recess 168, thereby locking the housing to the guard while the blade is in the blade change position. The housing lock is thus operated. The rotated control knob is above the wall-free area 161. Downward movement of the control knob 142 causes the bolt 148 to engage a pocket 152 in a spindle plate 154 on the spindle arrangement 33. The spindle arrangement is locked against rotation by the bolt for as long as downward pressure is applied to the control knob. The spindle lock is thus operated. A blade change operation can now be performed because the blade is locked against rotation.

Meanwhile, the pin 116 cannot leave the hook, or the minor leg of the channel, because the slider is biased upwards by the slider spring 128. The control button 100 is held in the blade change mode position 104 where it blocks any movement of the switch button 30. The motor cannot be energized because the switch button cannot operate the on/off switch 26.

Release of downward pressure on the control knob 142 causes the cam 144 and the bolt 148 to return to a raised position under the bias of the control spring 150. This initiates reversal of the above process as the bolt 148 disengages the pocket 152 to free the spindle plate 154, the spindle arrangement 33 and the blade 34. The spindle lock is no longer operated.

Counter-clockwise rotation of the control knob 142 through 90 degrees until it abuts the wall 158 causes the cam to retreat from the dowel's trailing end 140*b*. The dowel retracts into the housing and its leading end 140*a* exits the recess 168 under the bias of the spring 141. The housing 18 is no longer locked to the guard and the blade can leave the blade change position 34*c*. The housing lock is no longer operated.

The pin 116 is free to move upwards from the blind end of the minor leg of the channel so that the blade can re-adopt the parked position 34*a*. The push button 130 must be moved down slightly against the bias of the slider spring 128 before the pin is released from the hook 162 and is free to leave the minor leg 122*a* of the channel. Once this has occurred, the control button 100 is free to pivot into the parked mode position 108 causing the pin to move into the web 122*c* of the channel.

Referring to FIGS. 17A to 17D, the interlock may comprise an alternative slider 1240, an alternative push button 1300 and an alternative primary spring (not shown). Other features of the interlock, in particular the control button 100, the control arm 112, the control pin 116, the housing lock 138 and a spindle lock 146 are unchanged. Like the slider 124 described above (hereafter "the original slider 124"), the alternative slider 1240 forms a link between the control button, control arm and pin, on the one hand, and the housing lock and spindle lock, on the other hand.

The alternative slider has a different shape to the original slider. The alternative push button 1300 has also been reshaped with a chamfer 1300*a* on its top surface. The alternative push button is connected to the alternative slider via the straight stem 132 protruding outside the housing.

The alternative slider 1240 is mounted centrally upon the slider axis 126 and the stem 132 has been re-located to the alternative slider's rear end. The hook 162 is no longer formed between the nose 133 and the stem 132. Instead, an alternative hook 1620 has been re-shaped and re-located below the nose.

Figure 17A:
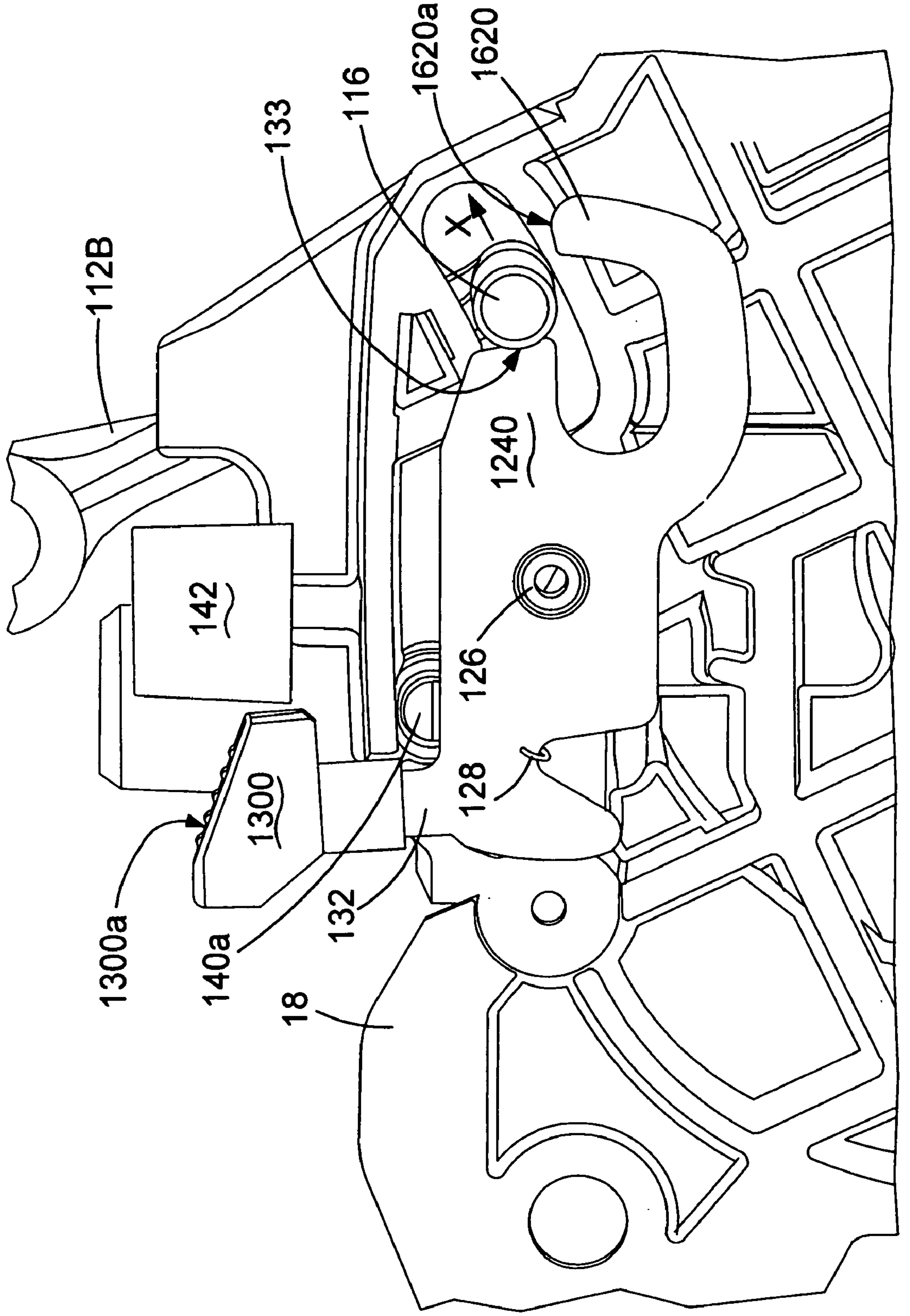
FIG. 17A to 17D show detail of the interlock, in particular an alternative slider and push button.

The alternative slider is biased, by the slider spring 128, to tilt clockwise so that it rests in a substantially horizontal position such that the alternative push button is in a raised position, as is shown in FIG. 17A. The body of the alternative slider prevents operation of the control shaft 134 and the housing lock by shielding the leading end 140*a* of the dowel 140. The nose 133 blocks the pin 116 from entering the minor leg 122*a*. This prevents unintentional selection of the blade change mode by the control button 100.

Like the primary spring 110 described above (hereinafter the "original primary spring 110") the alternative primary spring acts upon the control arm 112. However, instead of biasing the control arm so that the control button 100 returns to the parked mode position 108, the alternative primary spring biases the control button towards the blade change mode position 104.

Operation of the alternative slider is now described with reference to the two different scenarios which can occur when the pin is in the web 122*c*.

Figure 17B:
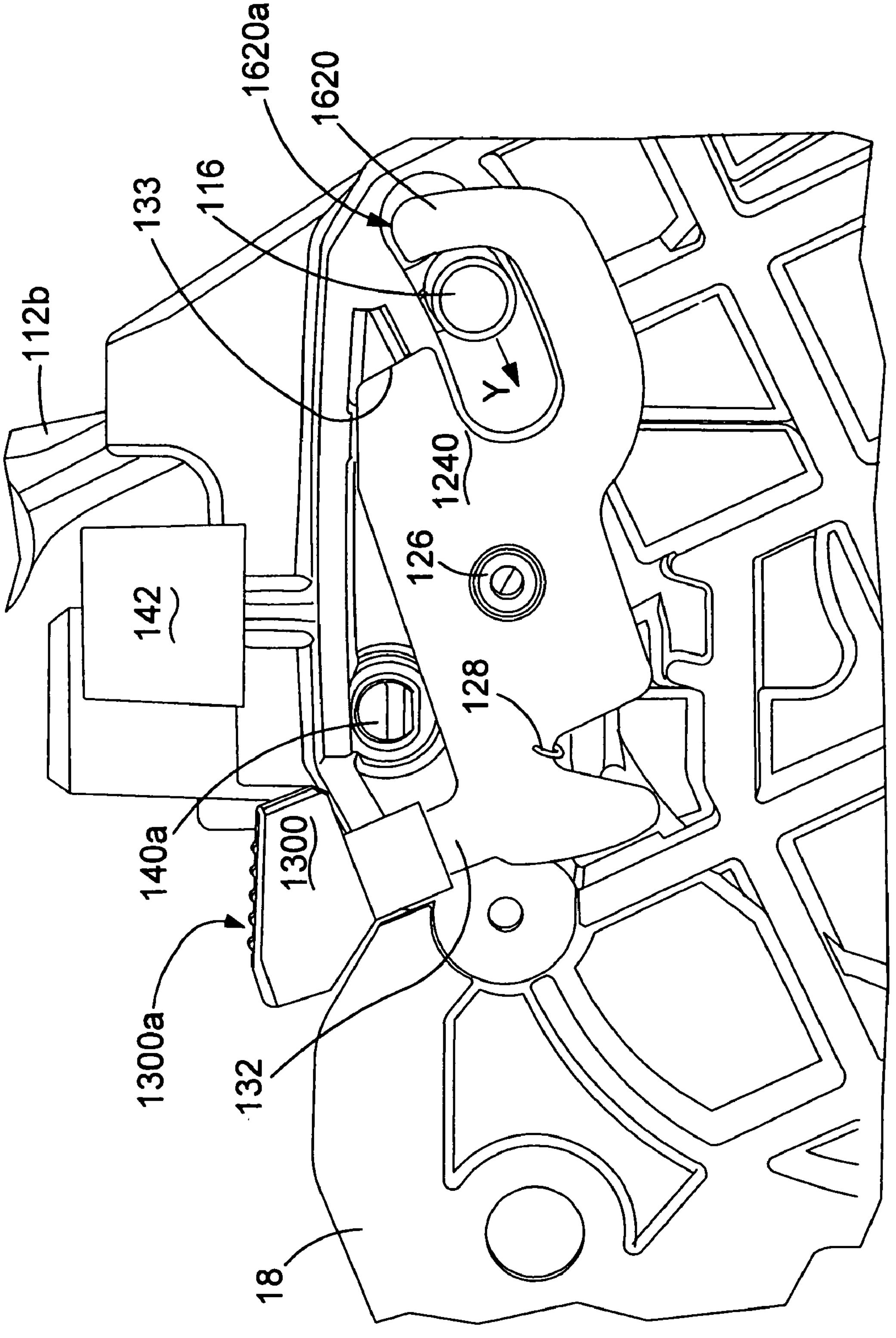
Figure 17C:
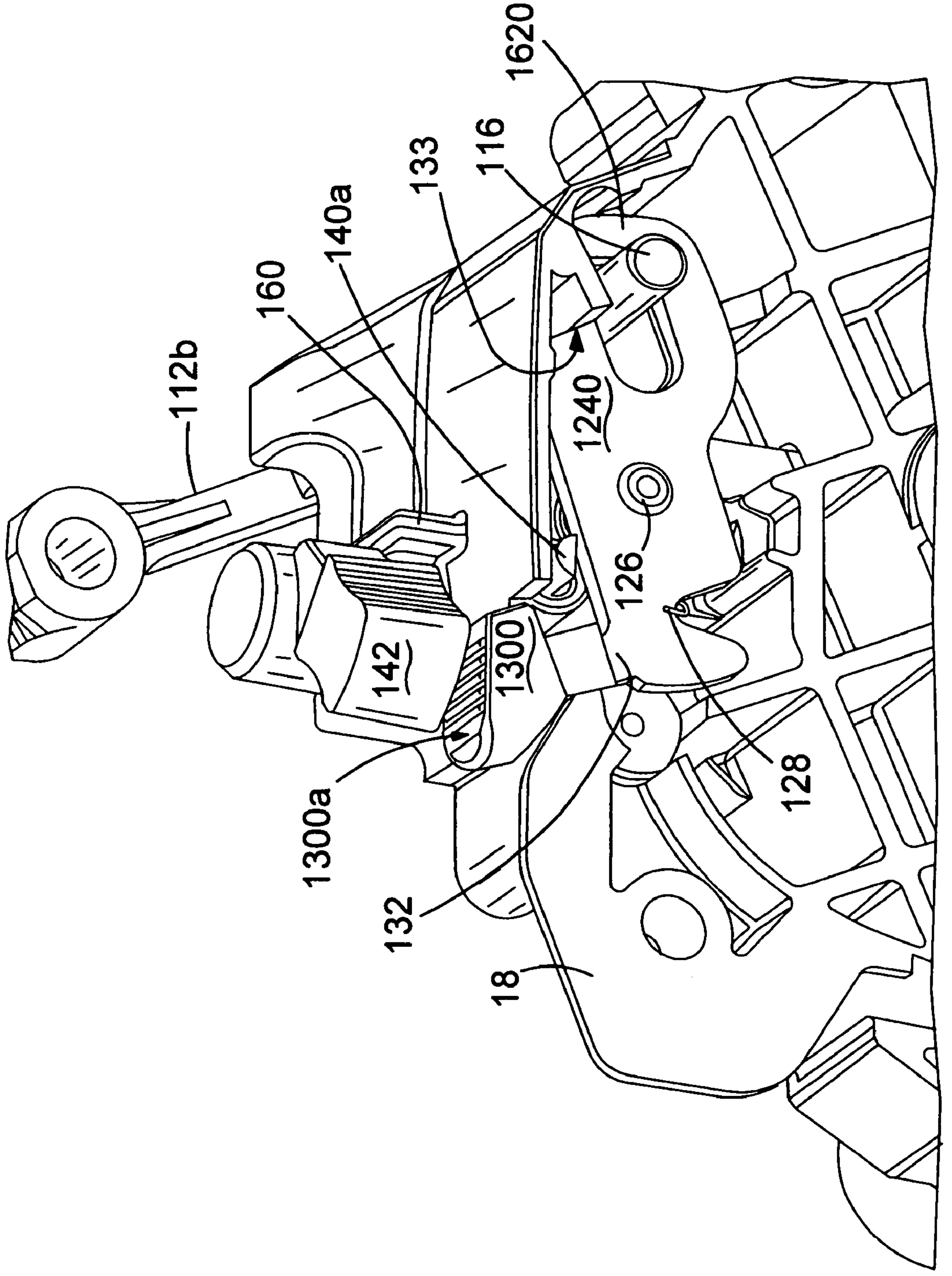
Figure 17D:
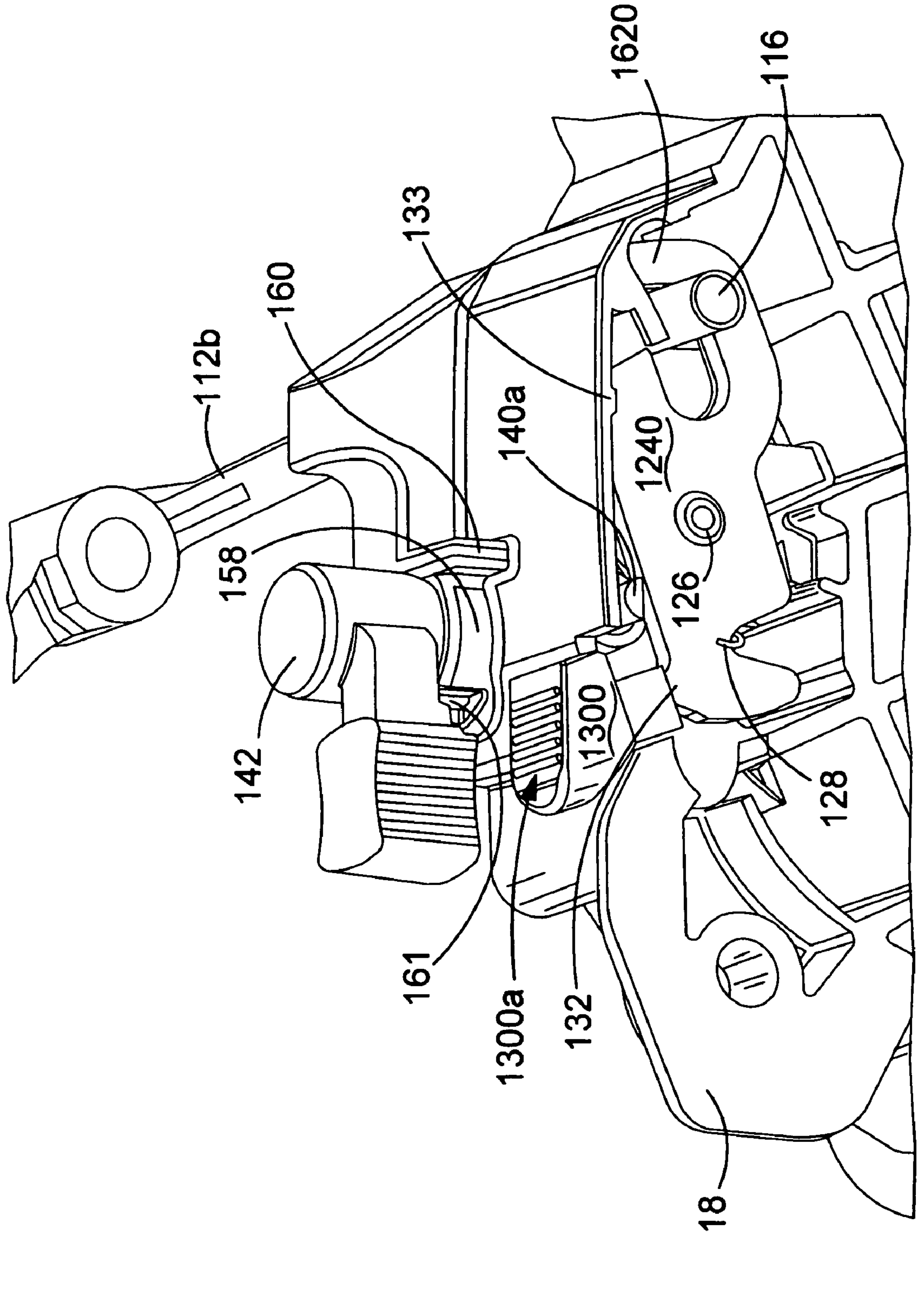

In a first scenario, the alternative push button 1300 is manually moved to a lowered position, as is shown in FIG. 17B, which tilts the alternative slider counter-clockwise so that the pin enters the mouth of the alternative hook 1620. Here, the pin is blocked from moving into the major leg 122*b* by the end 1620*a* of the alternative hook. The pin is biased to move, by the alternative primary spring, in the direction of an arrow Y, to the minor leg 122*a* and the control button pivots clockwise into the blade change mode position 106 where it remains. Should this occur, interaction between alternative slider and pin maintains the alternative slider in situ thereby exposing the dowel's leading end 140*a*. Referring to FIGS. 17C and 17D, the chamfer 1300*a* clears the path for clockwise rotation of the control knob 142. Clockwise rotation of the control knob causes the cam 144 to push the dowel towards the blade guard to engage the recess 168, thereby operating the housing lock. This first scenario is reversible up to the point where the blade change mode position is to be de-selected. This is done by manually pivoting the control button counter-clockwise to the parked mode position whereupon the alternative slider tilts clockwise to its position of rest under the bias of the slider spring 128.

In a second scenario, the alternative push button 1300 is stationary. The pin can move, against the bias of the alternative primary spring and in the direction of an arrow X, to the major leg 122*b* upon selection of "plunge cut" mode by the control button, as is shown in FIG. 17A. Should this occur, the alternative push button is locked in its raised position and the alternative slider cannot tilt counter-clockwise because the pin abuts the end 1620*a* of the alternative hook. The dowel's leading end 140*a* remains shielded by the slider. The control knob 142, which operates the housing lock, cannot be rotated clockwise because its path is blocked by the alternative push button. This isolates the housing lock. This second scenario is reversible.

The invention claimed is:

1. A power tool comprising:

a tool housing displaceably mounted to a foot plate;

a rotatable blade the rotational axis of which is fixed in relation to the housing; and an interlock for controlling movement of the housing with respect to the foot plate, wherein the interlock has a manually operable control button having at least two discrete user selectable positions, the control button mounted to one of the housing or foot plate and the control button cooperates with a channel fixed in relation to the other of the housing or foot plate to enable the control button to select between:

a first mode whereby movement of the housing is limited to a first range of motion to enable a plunge cut operation; and a second mode whereby movement of the housing is limited to a second range of motion to enable a blade change operation, the second range of motion being less than the first range of motion;

the channel comprising a major leg and a minor leg in communication with the major leg, wherein cooperation between the control button and the major leg selects the first mode and cooperation between the control button and the minor leg selects the second mode.

2. A power tool as claimed in claim 1, wherein the major leg terminates at a point closer to the foot plate than the point at which the minor leg terminates.

3. A power tool as claimed in claim 1, wherein the channel has a face substantially opposing the direction in which the housing moves towards the foot plate such that cooperation between the control button and the face selects a parked mode whereby movement of the housing from the parked position is blocked.

4. A power tool as claimed in claim 3, wherein the control button is biased to cooperate with the face.

5. A power tool as claimed in claim 3, the face has a detent at a location where the face communicates with the rest of the channel.

6. A power tool as claimed in claim 3, wherein the face is part of a web in the channel and wherein the web connects the major and minor legs at a location where the housing is in the parked position.

7. A power tool as claimed in claim 1, wherein the control button cooperates with the channel via an arm.

8. A power tool as claimed in claim 7, wherein the control button pivots about a control button axis fixed in relation to the one of the housing or foot plate, wherein the arm is pivotally coupled at one end to the control button and pivotally connected part way along its length to an arm axis fixed in relation to the control button axis.

9. A power tool axis as claimed in claim 8, wherein the arm has a control pin at a free end opposite the end of the arm coupled to the control button, wherein the control pin cooperates with the channel.

10. A power tool as claimed in claim 1, wherein the control button is moveable into the path of the switch button, preventing actuation thereof, when the blade change mode is selected.

11. A power tool as claimed in claim 10, wherein the control button is moveable into the path of the switch button, preventing actuation thereof, when the parked mode is selected.

12. A power tool as claimed in claim 10, wherein the interlock comprises:

a manually moveable slider mounted to the one of the housing or foot plate, wherein the slider is biased by a slider spring into a blocking position whereat the slider blocks selection of the blade change mode by the control button.

13. A power tool as claimed in claim 12, wherein the interlock comprises:

a housing lock for locking the housing in the blade change position; and a manually displaceable and rotatable control shaft for operating the housing lock, wherein the blocking position of the slider blocks operation of the control shaft.

14. A power tool as claimed in claim 13, wherein the interlock comprises:

a spindle lock for locking the blade against rotation, wherein the spindle lock is operable by the control shaft after operation of the housing lock.

15. A power tool as claimed in claim 14, wherein the one of rotation or displacement of the control shaft overcomes a barrier to operation of the spindle lock.

16. A power tool as claimed in claim 15, wherein the barrier is a wall that physically blocks operation of the spindle lock by the other of rotation or displacement of the control shaft.

17. A power tool as claimed in claim 13, wherein the housing lock comprises:

a slideable dowel mounted to the one of the housing or foot plate and coupled to the control shaft; and a recess fixed in relation to the other of the housing or foot plate;

wherein movement of the slider from the blocking position enables:

selection of the blade change mode;

movement of the housing into the blade change position whereat the dowel is aligned with the recess; and the one of rotation or displacement of the control shaft which causes engagement of the dowel with the recess thereby operating the housing lock.

18. A power tool as claimed in claim 17, wherein the dowel is biased into contact with a cam fixed to the control shaft, and rotatable therewith, whereby the housing lock is operable by rotation of the control shaft.

19. A power tool as claimed in claim 17, wherein the slider is prevented from leaving the blocking position when the plunge cut mode is selected by the control button.

20. A power tool as claimed in claim 19, wherein the slider has a manually operable push button which blocks operation of the control shaft when the slider is the blocking position.

21. A power tool as claimed in claim 17, wherein the control button is prevented from selecting the plunge cut mode when the slider moves from the blocking position.

22. A power tool as claimed in claim 21, wherein the spindle lock comprises:

a slideable bolt mounted to the one of the housing or foot plate and coupled to the control shaft; and a pocket in a spindle arrangement coupled to the blade, wherein the other of rotation or displacement of the control shaft causes engagement between the bolt and the pocket thereby operating of the spindle lock.

23. A power tool as claimed in claim 1, wherein the power tool is a plunge-cut circular saw, wherein the tool housing is pivotably mounted to the foot plate and the blade is a circular saw blade, wherein the blade is shielded by a guard while the housing is in the blade change position or the parked position.

24. A power tool as claimed in claim 1, wherein the power tool is a router, wherein the tool housing is displaceably mounted to the foot plate and the blade is a router bit.

* * * * *